United States Patent
Bi et al.

(10) Patent No.: US 9,202,248 B2
(45) Date of Patent: Dec. 1, 2015

(54) AD MATCHING SYSTEM AND METHOD THEREOF

(75) Inventors: Hongguang Bi, Irvine, CA (US); Julie Mattern, Hawthorne, CA (US); Eric Jamieson, Los Angeles, CA (US); Matt Meyer, Santa Monica, CA (US); Duc Chau, San Pedro, CA (US)

(73) Assignee: The Rubicon Project, Inc., Playa Vista, CA (US)

( * ) Notice: Subject to any disclaimer, the term of this patent is extended or adjusted under 35 U.S.C. 154(b) by 1203 days.

(21) Appl. No.: 12/402,353

(22) Filed: Mar. 11, 2009

(65) Prior Publication Data

US 2009/0234713 A1   Sep. 17, 2009

Related U.S. Application Data

(60) Provisional application No. 61/069,082, filed on Mar. 11, 2008, provisional application No. 61/197,942, filed on Oct. 31, 2008, provisional application No. 61/197,940, filed on Oct. 31, 2008.

(51) Int. Cl.
   *G06Q 30/02* (2012.01)
   *G06Q 30/08* (2012.01)
   *G06Q 40/00* (2012.01)

(52) U.S. Cl.
   CPC ........... *G06Q 30/08* (2013.01); *G06Q 30/02* (2013.01); *G06Q 30/0247* (2013.01); *G06Q 30/0256* (2013.01); *G06Q 30/0267* (2013.01); *G06Q 40/12* (2013.12)

(58) Field of Classification Search
   USPC .............................................. 705/14, 14.71
   See application file for complete search history.

(56) References Cited

U.S. PATENT DOCUMENTS

| 5,948,061 A | 9/1999 | Merrimen et al. |
| 6,108,703 A | 8/2000 | Leighton et al. |

(Continued)

FOREIGN PATENT DOCUMENTS

| CA | 2673352 | 6/2009 |
| WO | WO 00/58897 | 10/2000 |

(Continued)

OTHER PUBLICATIONS

Greg Yardley: "Rubicon Project initial impressions", Feb. 23, 2008, pp. 1-5, XP002674792, retrieved from the Internet: http://yardley.ca/2008/02/23rubicon-project-initial-impressions/ (retrieved on Apr. 25, 2012).

(Continued)

*Primary Examiner* — Eric Netzloff
(74) *Attorney, Agent, or Firm* — Knobbe, Martens, Olson & Bear LLP

(57) ABSTRACT

A system reducing the number of default ads displayed by a user agent thereby maximizing revenue for webpage publishers. To maximize revenue, the system manages multiple ad networks so that webpage publishers can have access to advertisements from the multiple ad networks. Typically, when an ad network serves a default ad, the system queries the next ad network. If the next ad network serves a non-default ad, then the ad is served. Otherwise, the system selects another ad network until either a non-default ad is served or a specific period of time elapses or a maximum number of ad networks have been queried, in which case the default ad is served. Ad networks may be ranked by revenue generation and/or the probability of serving a default ad. Inquiries to ad networks may be biased according to such rankings.

24 Claims, 25 Drawing Sheets

(56) References Cited

U.S. PATENT DOCUMENTS

| | | | |
|---|---|---|---|
| 6,285,987 B1 * | 9/2001 | Roth et al. | 705/14.71 |
| 6,687,737 B2 | 2/2004 | Landsman et al. | |
| 6,757,571 B1 | 6/2004 | Toyama | |
| 6,763,148 B1 | 7/2004 | Sternberg et al. | |
| 6,892,193 B2 | 5/2005 | Bolle et al. | |
| 6,937,744 B1 | 8/2005 | Toyama | |
| 6,954,783 B1 | 10/2005 | Bodwell et al. | |
| 6,973,438 B1 | 12/2005 | Philyaw | |
| 7,076,244 B2 | 7/2006 | Lazaridis et al. | |
| 7,085,817 B1 | 8/2006 | Tock et al. | |
| 7,406,498 B2 | 7/2008 | Reshef et al. | |
| 7,475,404 B2 | 1/2009 | Hamel | |
| 7,650,420 B2 | 1/2010 | Chong et al. | |
| 7,882,046 B1 | 2/2011 | Kizhakkekalathil et al. | |
| 8,472,728 B1 | 6/2013 | Chau et al. | |
| 8,473,346 B2 | 6/2013 | Mattern et al. | |
| 8,554,683 B2 | 10/2013 | Knapp et al. | |
| 8,831,987 B2 | 9/2014 | Knapp et al. | |
| 2002/0161680 A1 | 10/2002 | Tarnoff | |
| 2004/0054589 A1 | 3/2004 | Nicholas et al. | |
| 2004/0103024 A1 * | 5/2004 | Patel et al. | 705/14 |
| 2004/0117213 A1 | 6/2004 | Pache et al. | |
| 2004/0249709 A1 | 12/2004 | Donovan et al. | |
| 2005/0055271 A1 | 3/2005 | Axe et al. | |
| 2005/0267798 A1 | 12/2005 | Panara | |
| 2006/0026067 A1 | 2/2006 | Nicholas et al. | |
| 2006/0212350 A1 | 9/2006 | Ellis et al. | |
| 2006/0253578 A1 | 11/2006 | Dixon et al. | |
| 2007/0038516 A1 | 2/2007 | Apple et al. | |
| 2007/0067267 A1 | 3/2007 | Ives | |
| 2007/0174118 A1 | 7/2007 | Dekel et al. | |
| 2007/0174230 A1 | 7/2007 | Martin | |
| 2007/0192194 A1 * | 8/2007 | O'Donnell et al. | 705/14 |
| 2007/0192356 A1 * | 8/2007 | O'Kelley | 707/102 |
| 2007/0239532 A1 * | 10/2007 | Benson et al. | 705/14 |
| 2007/0250301 A1 | 10/2007 | Vaisberg et al. | |
| 2007/0255702 A1 | 11/2007 | Orme | |
| 2007/0261112 A1 | 11/2007 | Todd et al. | |
| 2008/0040225 A1 | 2/2008 | Roker | |
| 2008/0040226 A1 | 2/2008 | Roker | |
| 2008/0040302 A1 | 2/2008 | Perrizo | |
| 2008/0140508 A1 | 6/2008 | Anand et al. | |
| 2008/0270359 A1 | 10/2008 | Madhavan et al. | |
| 2008/0281983 A1 | 11/2008 | Cooley et al. | |
| 2009/0018907 A1 * | 1/2009 | McCarthy et al. | 705/14 |
| 2009/0055267 A1 * | 2/2009 | Roker | 705/14 |
| 2009/0234713 A1 | 9/2009 | Bi et al. | |
| 2009/0327084 A1 | 12/2009 | Patton et al. | |
| 2010/0106715 A1 | 4/2010 | Byun et al. | |
| 2013/0282478 A1 | 10/2013 | Mattern et al. | |
| 2014/0172573 A1 | 6/2014 | Saurabh | |

FOREIGN PATENT DOCUMENTS

| | | |
|---|---|---|
| WO | WO2007022137 A2 | 2/2007 |
| WO | WO 2009/114634 | 9/2009 |

OTHER PUBLICATIONS

Extended European Search Report for corresponding European Application 09718908.8.

U.S. Appl. No. 61/069,082, filed Mar. 11, 2008, Bi et al.

U.S. Appl. No. 61/197,942, filed Oct. 31, 2008, Williams et al.

Akamai Technologies, Inc., Fast Internet Technology with FreeFlow, Apr. 2000, Cambridge, MA.

Akamai Technologies, Inc., FreeFlow Flyer, 1999, Cambridge MA.

Cisco Systems, Inc., The Network Architecture Behind NetAid, 1999, pp. 1-17, San Jose, CA.

Doubleclick, Inc., Technical Specs for the DoubleClick DART System, www.doubleclick.com, 1998.

Langheinrich, M., Unintrusive Customization Techniques for Web Advertising, May 1999, pp. 1-18, Proceedings of the Eighth International World Wide Web Conference, Canada.

PubMatic (Apr. 16, 2009). Predicting Ad Network Frequency Capping to Increase Publisher Revenue; Retrieved from http://www.pubmatic.com/wp-content!uploads/2009/07/PubMatic.FrequencyOptimization.2009.pdf (Hereafter, Pubmatic).

PubMatic (Apr. 16, 2009). Pubmatic New Technology Increased Publisher Revenu from Ad Network Frequency Capped Campaigns; Retrieved from http://www.pubmatic.com/04-16-2009).

* cited by examiner

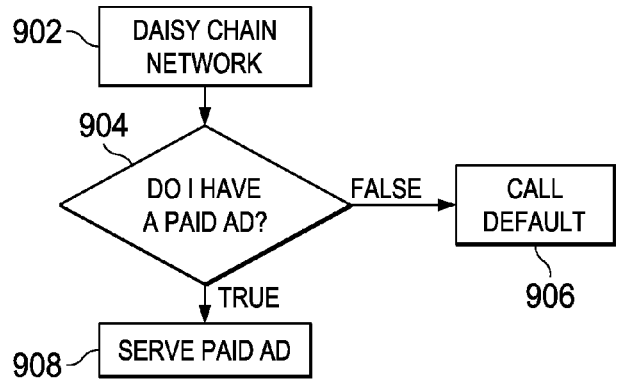

FIG. 9A

| | NETWORKS | FLOOR PRICE | DEFAULT/BACKUP/HOUSE AD |
|---|---|---|---|
| 912 | A | .90 | AD NETWORK TAG V |
| 914 | B | .85 | AD NETWORK TAG W |
| 916 | C | .87 | AD NETWORK TAG X |
| 918 | D | .60 | AD NETWORK TAG Y |
| 920 | E | .15 | AD NETWORK TAG Z |

FIG. 9B

<!....Rubicon Project tag ------------------------------------------------
Site: Rubicon Demo    Zone: My Site    Site: Leaderboard (728 x 90)

```
<Script language = "Javascript" type = "text/javascript">
var cb = math.random(); var d = document;
d.write('<script language = "Javascript" type = "text/javascript"');
d.write('src="http://optimized-by.rubiconproject.com/a/2001/2001/2002-2.js?cb+'>');
d.write('<Vscr' + 'ipt>');
</script>
<!---- End rubicon project tag ....>
```

FIG. 9C

| | NETWORKS | FLOOR PRICE | DEFAULT/BACKUP/HOUSE AD |
|---|---|---|---|
| 912 | A | .90 | DEFAULT KILLER (DK) TAG |
| 914 | B | .85 | DEFAULT KILLER (DK) TAG |
| 916 | C | .87 | DEFAULT KILLER (DK) TAG |
| 918 | D | .60 | DEFAULT KILLER (DK) TAG |
| 920 | E | .15 | DEFAULT KILLER (DK) TAG |

…

AD MATCHING SYSTEM AND METHOD THEREOF

REFERENCE TO RELATED APPLICATIONS

This application claims priority to U.S. Provisional Application Ser. No. 61/069,082 titled WEB PAGE AD MATCHING SYSTEM which was filed on Mar. 11, 2008 by Peter Bi, Julie Mattern, Eric Jamieson, Matt Meyer, and Due Chau; U.S. Provisional Application Ser. No. 61/197,942 titled MACHINE VISION BY EXAMPLE that was filed on Oct. 31, 2008 by David Williams and Due Chau; and U.S. Provisional Application Ser. No. 61/197,940 titled ADVERTISING CONTENT ROUTER ENABLING AD QUALITY ANALYSIS, MONITORING, AND ENFORCEMENT that was filed on Oct. 31, 2008 by Karim Nassar, Mark Douglas, Damien Hogan, David Williams, and Frank Addante, all of which are hereby incorporated by reference in their entirety, including, any appendices, screen shots, and references therein.

FIELD OF THE APPLICATION

The present application relates to advertisements, and more particularly, to meeting each publisher's advertising initiatives by matching ad impressions with the most advantageous opportunity from a plurality of ad networks, generally based on revenue produced.

BACKGROUND

Since its inception, the online advertising market has undergone massive growth with $27 billion exchanging hands in 2007, expecting to hit $147 billion by 2012. The most significant contributor to the online advertising market is the rapid spawning of ad networks. As the number of buyers and sellers increased, more ad networks emerged to serve as brokers for advertisers. Today, the online advertising market is an ever-expanding market fragmented by ad spending that has spread among 300+ disparate advertising networks worldwide including Google's AdSense, Yahoo!'s Publisher Network, HispanoClick, and Adtegrity. The abundance of these ad networks has created new challenges for websites trying to earn top dollar from the unsold ad space.

Currently, ad networks allow website publishers to generate revenue by placing advertisements from the ad networks on their webpages. In many Web applications and on many websites, advertisements are presented in the form of banners, graphic squares, text advertisements, video advertisements, pop-up and pop-under advertisements, Flash or other animated advertisements that move across the screen, etc. and displayed prominently on a web display, referred to as a "webpage." Users attracted to an advertisement often "click" on the advertisement by positioning a screen cursor on the advertisement and then depressing a button on a mouse or other input device. By clicking on the advertisement, a "hyperlink" to another website, associated with the advertisement and usually the home site of the advertiser, generates a path to the advertiser's designated page. Typically, the name of the path is presented to the user in the form of a uniform resource listing ("URL"), such as "ABC—Inc.com," followed by a directory path designating the particular page in the site that the advertiser wishes to be displayed, such as "/directory 13 name/page—name."

By establishing a relationship with an ad network, unsold advertisement inventory on a website can be sold such that both the webpage publisher and the ad network benefit. These ad networks also build relationships directly with advertisers who make ad purchases. Ad networks then seek to match the advertisers they have relationships with to publishers they have relationships with, thereby maximizing the amount of space they can sell.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of the present application, a system is presented. The system includes a user agent for rendering a page, wherein the page includes an ad tag and at least one ad impression. The ad tag within the page causes the user agent to request ad network information. The system also includes an ad engine capable of receiving requests for ad network information. In response to the requests for ad network information, the ad engine provides ad network tags to the user agent, the user agent receiving the ad network tags and sending ad requests based on the ad network tags.

Furthermore, the system includes a plurality of ad networks each corresponding to the ad network tags and capable of receiving ad requests from the user agent. Each ad network within the plurality of ad networks serves default or non-default ads in response to the ad requests from the user agent until a qualified ad is obtained by the user agent for the at least one ad impression within the page. The qualified ad is either a non-default ad served from ad networks within the plurality of ad networks, a default ad after a maximum number of ads from the plurality of ad networks have been served, or a default ad after a period of time elapses.

In accordance with another aspect of the present application, a system is presented. The system includes a web server hosting a website, wherein the website includes a plurality of pages, at least one page incorporating an ad tag and at least one ad impression. The system also includes a user agent running a browser for rendering the at least one page from the web server, wherein the browser sets cookies or objects for storing previously seen ads and processes the ad tag within the at least one page causing requests for ad network tags. Any previously seen ad information stored as cookies or objects is sent along with the requests for ad network tags.

Furthermore, the system includes an ad engine capable of receiving requests for ad network tags and any previously seen ad information stored as cookies or objects. In response to the requests for ad network information, the ad engine provides ad network tags to the user agent using the previously seen ad information stored as cookies or objects. The user agent receives the ad network tags and sends ad queries based on the ad network tags.

In addition, the system includes a plurality of ad networks each corresponding to the ad network tags and capable of receiving ad queries from the user agent. Each ad network within the plurality of ad networks serves default or non-default ads in response to the ad requests from the user agent until a qualified ad is obtained by the user agent for the at least one ad impression within the at least one page from the plurality of ad networks.

In accordance with yet another aspect of the present application, a system for maximizing advertisement revenue is presented. The system includes a plurality of ad networks capable of receiving ad requests, wherein each ad network within the plurality of ad networks serve default or non-default ads in response to the ad requests. The system also includes a user agent for rendering a page. The page includes an ad tag and ad impressions, the ad tag within the page causing the user agent to request ad network tags. Each ad network tag references an ad network within the plurality of ad networks.

Furthermore, the system includes an ad engine capable of receiving requests for ad network tags. In response to the requests for the ad network tags, the ad engine provides ad network tags to the user agent. The user agent receives the ad network tags and sends ad requests based on the ad network tags to the plurality of ad networks until a qualified ad is obtained from the plurality of ad networks by the user agent. The qualified ad is either a non-default ad served from an ad network within the plurality of ad networks or a default ad after a maximum number of ads within the plurality of ad networks have been requested.

In accordance with still yet another aspect of the present application, an ad engine for providing intelligent ad selections is presented. The ad engine includes a server connected to a network. The server includes at least one processor, a database for storing ad network tags corresponding to a plurality of ad networks, and memory operatively coupled to the processor, the memory storing program instructions when executed by the processor causes the processor execute a plurality of routines. The routines include receiving a request for ad network information from a user agent via the network, determining information about the user agent including any previously seen ad networks by the user agent, based on the determined information about the user agent, selecting an ad network and retrieving the ad tag associated with the ad network in the database, and sending the ad tag associated with the selected ad network in response to the received request for ad network information to the user agent via the network.

In accordance with another aspect of the present application, a computer-implemented method for managing a plurality of ad networks so that optimal ads from the ad networks are provided to user agents is presented. The method includes receiving requests for ad network tags from a user agent and responding to the requests by serving ad network tags until an optimal ad is obtained by the user agent, wherein the ad network tags identify ad networks. For each received request for an ad network tag from the user agent, the method determines information about the user agent including any previously seen ad networks that served default ads by retrieving cookies or objects on the user agent, selects an ad network that is not one of the previously seen ad networks that served default ads, retrieves an ad tag associated with the selected ad network, and sends the ad tag associated with the selected ad network in response to the received request for ad network information to the user agent.

In accordance with yet another aspect of the present application, a computer program product for maximizing advertisement revenues running on an ad engine having a processor is presented. The computer program product is contained within computer-readable memory and includes code that directs the processor to communicate with a user agent including receiving requests for ad network tags and sending ad network tags to the user agent until a qualified ad is provided to the user agent. The computer program products also includes code that directs the processor to determine information about the user agent including any previously seen ad networks by the user agent, wherein the information allows the ad engine to select an ad network along with a corresponding ad network tag to be sent to the user agent.

In accordance with another aspect of the present application, a computer readable medium storing instructions for causing at least one processor to perform a method for traversing through a plurality of ad networks to retrieve optimized ads is presented. The method includes receiving a request for ad network information from a user agent. The method also includes determining information about the user agent including any previously seen ad networks by the user agent. Furthermore, the method includes selecting an ad network based on the determined information about the user agent and retrieving the ad network tag associated with the ad network. In addition, the method includes sending the ad network tag associated with the selected ad network in response to the received request for ad network information to the user agent.

In accordance with another aspect of the present application, an ad engine is presented. The ad engine includes a server connected to a network. The server includes at least one processor, a database for storing ad network tags referencing ad networks, a memory operatively coupled to the processor, the memory storing program instructions which, when executed by the processor, causes the processor to execute routines. The routines include receiving a request for ad network information from a user agent via the network, selecting an ad network, requesting for an ad from the selected ad network, determining whether the ad uses a default tag, and repeat selecting ad networks and requesting ads from the selected networks if the ad uses default tags, otherwise, sending the ad from the selected ad network to the user agent via the network.

In accordance with another aspect of the present application, a computer readable medium storing instructions for causing at least one processor to perform a method that provides higher-paying advertisements for maximizing revenue. The method includes sending a page request to a host server. The method also includes receiving a page based on the page request from the host server, the page having an ad tag embedded therein. Furthermore, the method includes parsing the received page from the host server, wherein the ad tag, when processed, causes repeated requests for ad network tags corresponding to a plurality of ad networks from an ad engine until a qualified ad is received.

In accordance with yet another aspect of the present application, a computer-implemented method for reducing default ads. The method includes requesting for ad network tags from an ad engine until a qualified ad is received. For each ad network tag requested from the ad engine, querying for an ad from an ad network associated with the ad network tag, receiving the ad from the ad network based on the query, if the ad uses an IFrame default tag, storing the ad within a cookie, if the ad uses a JavaScript default tag, storing the ad within an object, and when the ad uses IFrame or JavaScript default tags and the maximum number of ad networks have not been queried, requesting for another ad network tag from the ad engine passing any cookies or objects to the ad engine.

In accordance with still yet another aspect of the present application, in a user computer system having a display screen and a graphical user interface (GUI) supporting a browser, a method for optimizing advertisements from a plurality of ad networks to fill ad impressions on a webpage generated by a host server and displayed by the browser supported on the GUI. The method includes sending a request to the host server, wherein the host server serves a webpage in response to the request, the webpage incorporating standard markup language and an ad tag. The method also includes processing the ad tag within the webpage causes requests for ad network information from an ad engine, the ad engine, in response, providing ad network tags. Furthermore the method includes receiving the ad network tags from the ad engine, the ad network tags, when processed, cause a request for ads from ad networks referenced by the ad networks tags until a qualified ad is received for each ad impression. In addition, the method includes displaying the standard markup language within the webpage from the host server and the qualified ad for each ad impression through the browser supported on the GUI.

In accordance with another aspect of the present application, a host server is presented. The host server includes at least one processor and a database for storing at least one webpage, the at least one webpage having an ad tag and at least one ad impression. The host server also includes memory operatively coupled to the processor, the memory storing program instructions that when executed by the processor, causes the processor to receive a request for a webpage from a user agent, retrieve the webpage from the database, and send the webpage to the user agent. The user agent processes the webpage including the ad tag, the processing of the ad tag within the webpage causing the user agent to request ad network information from an ad engine that optimizes a plurality of ad networks.

In accordance with a further aspect of the present application, an ad network is presented. The ad network includes a server connected to a network. The server includes at least one processor and a database for storing default and non-default ads. The server also includes memory operatively coupled to the processor, the memory storing program instructions that when executed by the processor, causes the ad network to receive a request for an ad from a user agent via the network, determine from within the database the ad to be given to the user agent based on the received request, and send the determined ad to the user agent, wherein the user agent will determine if it is a qualified ad, and if not, the user agent will request another ad network to provide the ad.

In accordance with another aspect of the present application, an ad engine is presented. The ad engine includes a server connected to a network having at least one processor, a database for storing ad network tags, a memory operatively coupled to the processor, the memory storing program instructions. When the program instructions are executed by the processor, the ad engine receives a request from a user agent for an ad network tag through the network, retrieves the ad network tags from the database, applies restrictions to the ad network tags, selects an ad network tag by weighing the restricted ad network tags, and returns the selected ad network tag to the user agent in response to the request for the ad network tag through the network.

In accordance with still yet another aspect of the present application an ad engine having a computer readable medium for storing instructions is presented. The instructions, when executed by at least one processor on the ad engine, causes the ad engine to perform a method. The method includes, in a separate process, periodically gathering a set of ad network tags associated with a plurality of ad networks, receiving a request for an ad network tag along with user information from a user agent, optimizing the periodically gathered set of ad network tags by ranking the set of ad network tags using a set of rules and the user information from the user agent, and selecting an ad network tag from the optimized set of ad network tags and serving the selected ad network tag in response to the request from the user agent.

In accordance with still another aspect of the present application an ad engine having a computer readable medium for storing instructions is presented. The instructions, when executed by at least one processor on the ad engine, causes the ad engine to perform a method. The method includes receiving a request for an ad network tag along with user information from a user agent, retrieving a set of available ad network tags, optimizing the set of available ad network tags by ranking the set of ad network tags using a set of rules and user information from the user agent, and selecting an ad network tag from the optimized set of ad network tags and serving the selected ad network tag in response to the request from the user agent.

In accordance with still another aspect of the present application an ad engine having a computer readable medium for storing instructions is presented. The instructions, when executed by at least one processor on the ad engine, causes the ad engine to perform a method. The method includes receiving a request for an ad network tag along with user information from a user agent, sending the user information to a plurality of partners and receiving partner data based on the user information, retrieving a set of ad network tags, optimizing the set of available ad network tags by ranking the set of ad network tags using a set of rules and partner data, and selecting an ad network tag from the optimized set of ad network tags and serving the selected ad network tag in response to the request from the user agent.

In accordance with still another aspect of the present application an ad engine having a computer readable medium for storing instructions is presented. The instructions, when executed by at least one processor on the ad engine, causes the ad engine to perform a method. The method includes receiving a request for an ad network tag along with user information from a user agent, retrieving a set of local ad network tags, selecting a local ad network tag from the set of local ad network tags that generates the highest revenue, receiving a set of partner ad network tags, selecting a partner ad network tag from the set of partner ad network tags that generates the highest revenue, serving the local ad network tag if the revenue generated by the local ad network tag is greater than the revenue generated by the partner ad network tag, and serving the partner ad network tag if the revenue generated by the partner ad network tag is greater than the revenue generated by the local ad network tag.

In accordance with another aspect of the present application, an ad engine having a computer readable medium for storing instructions is presented. The instructions, when executed by at least one processor on the ad engine, causes the ad engine to perform a method. The method includes receiving a request for an ad network tag along with user information from a user agent, retrieving a set of partner ad network tags, applying restrictions, targeting, and optimizations to the set of ad network tags, selecting an ad network tag from the restricted, targeted, and optimized set of ad network tags, and serving the selected ad network tag in response to the request from the user agent.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIGS. 9A, 9B, 9C, 9D, and 9E depict several illustrations for a daisy chain network and compares them to illustrations of a default ad killer network in accordance with one aspect of the present application;

DETAILED DESCRIPTION

The detailed description set forth below in connection with the appended drawings is intended as a description of presently-preferred embodiments of the application and is not intended to represent the only forms in which the present application may be constructed and/or utilized. The description sets forth the functions and the sequence of steps for constructing and operating the application in connection with the illustrated embodiments. It is to be understood, however, that the same or equivalent functions and sequences may be accomplished by different embodiments that are also intended to be encompassed within the spirit and scope of this application.

Figure 1:
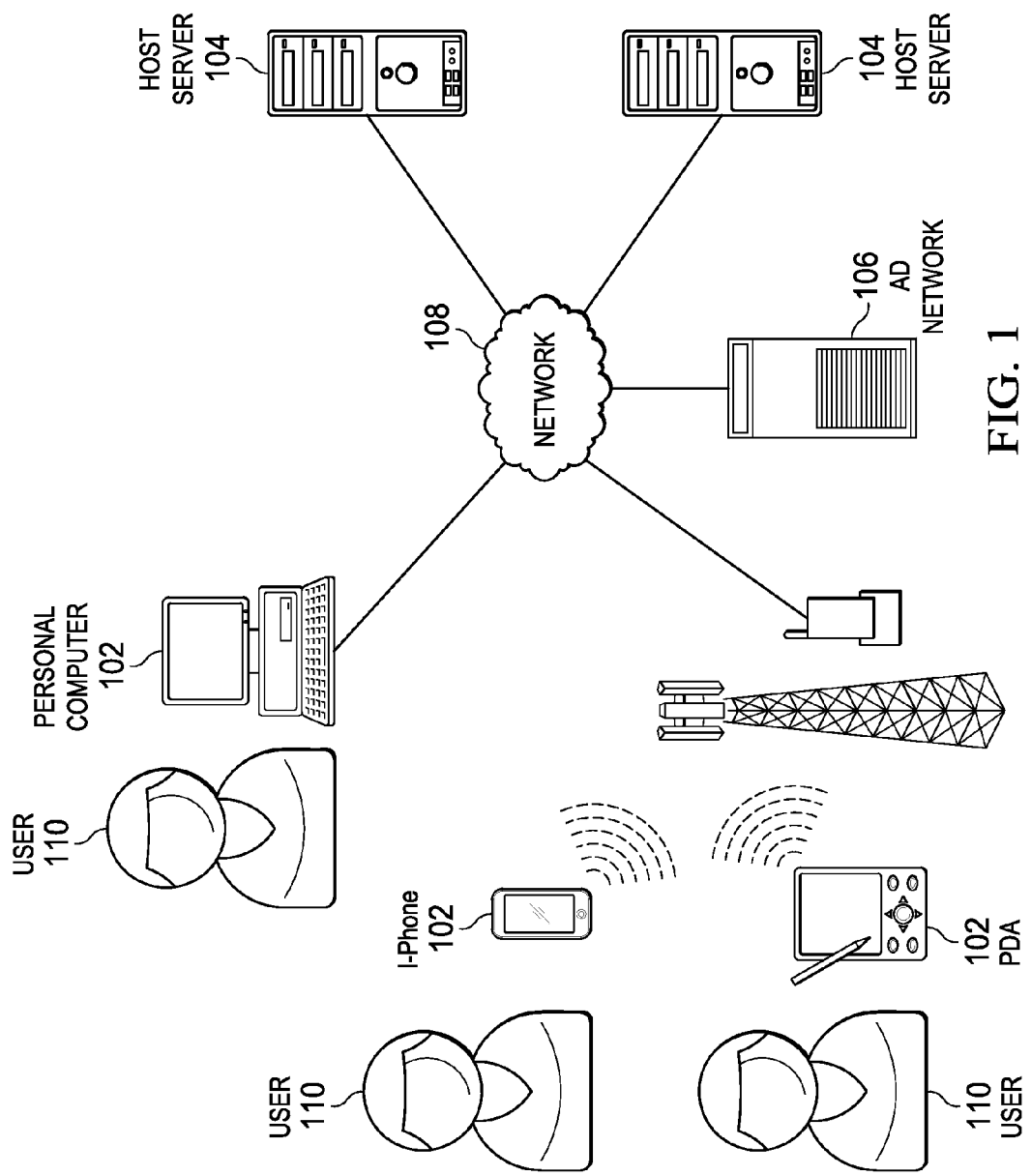
FIG. 1 illustrates an environment in which a user agent renders a webpage received from a host server along with advertisements from a single ad network in accordance with one aspect of the present application.

FIG. 1 represents an environment for online advertising. Advertising can take the form of banner ads, pop up ads, floating ads, interstitial ads, unicast ads, takeover ads, and contextual ads, all of which can be displayed on personal digital assistants (PDAs) 102, iPhones 102, personal computers 102, laptops, cell phones, etc. Often advertising is directed towards RSS feeds, blogs, instant messaging applications, adware, emails, and other programs executed on these user agents 102.

More typically, however, ads are displayed on a browser running on user agent 102. A browser is software that runs on a computer system and allows the user to view hypertext markup language (HTML) documents and access files and software related to those documents. A browser, for purposes of this application, may also be referred to as a user agent 102. When advertisements are formatted in such a way that a browser can display it properly, the advertisements are called creatives.

As shown, this environment provides the ability for an ad network 106 to connect with companies who wish to run advertisements efficiently and effectively off their websites. Typically, websites incorporate a group of HTML documents and associated files, scripts, and databases that are served up by host server 104, which can take the form of a hypertext transfer protocol (HTTP) server. The documents in a website generally cover one or more related topics and are interconnected through hyperlinks. Most websites have a home page as their starting point, which frequently functions as a table of contents for the site. Many large organizations, such as corporations, will have one or more host servers 104 dedicated to a single website. However, a single host server 104 can also serve several small websites, such as those owned by individuals.

While it is understood that multiple ad networks 106 may exist in this environment, a webpage publisher generally establishes a relationship with a single ad network 106 to supply all advertisements to the publisher's webpage. When serving ads within the environment, user agent 102 begins by requesting a webpage from host server 104, which may possibly be part of a company's website. In turn, host server 104 returns a webpage in the form of an HTML document. User agent 102 then parses and renders the document. When the document includes ad impressions, the browser sends a request for advertisements to an ad network 106 referenced within the document by an ad network tag. In response, the ad network 106 referenced by the ad network tag serves advertisements to the browser using a snippet of code that represents the advertisement.

As shown in FIG. 1, advertisements were provided to user agents 102 through direct agreements made between webpage publishers on host server 104 and individual ad networks 106 referenced by an ad network tag. The ad network 106 would review information in this request including the subject matter of the webpage, the size of advertisement requested, or any other pertinent information. Ad network 106 would then transmit an advertisement through network 108 to user agent 102. The ad would then be displayed on the webpage on the user agent 102.

From the advertisement displayed on user agent 102, user 110 could click on the advertisement by positioning a screen cursor on the advertisement on user agent 102 and then press a button on a mouse or other input device. When the user 110 clicked on the advertisement, a hyperlink to another website that would be associated with the advertisement, usually the home site of the advertiser, invoked a path to the advertiser's designated page. Typically, the name of the path was presented to the user in the form of a uniform resource listing (URL), such as "ABC—Inc.com," followed by a directory path designating the particular page in the website that the advertiser wished to be displayed, such as "/directory 13 name/page—name."

As described above, a webpage publisher contracted with a single ad network 106 to provide ads. Often, however, the provided ads were low paying, if not defaults, resulting in the loss of revenue for the webpage publishers. As the World Wide Web continues to grow, it is commonplace for many websites to generate revenue by only placing advertisements on the pages provided by their websites. Thus, the environment presented above, provides significant limitations within the current ad serving landscape.

Before describing details of the present application, definitions for terms used throughout this application are provided below. While the language provided within the definitions are intended to enable one skilled in the relevant art to understand the complexity of the present application, the terms, as defined, should not be construed as limiting to their scope.

The term advertisement refers to a communication in order to persuade potential customers to purchase a brand, product, or service. With reference herein, ads can take the form of banner ads, pop up ads, floating ads, interstitial ads, unicast ads, takeover ads, contextual ads, etc. Ads may be referred to advertisements, content, creative, and promotion. Creatives refer to advertisements formatted in such a way that a web browser can display it properly. Creatives also refer to correlated content for an ad.

A browser is software that runs on a computer system and allows the user to view documents written in markup language and access files and software related to those documents. Browser software is built on the concept of hyperlinks which allow users 110 to point and click with a mouse in order to jump from document to document in whatever order they desire. Most browsers also are capable of downloading and transferring files, providing access to newsgroups, displaying graphics embedded in the document, playing audio and video files associated with the document and executing small programs such as java applets or active x controls included by programmers in the documents. Helper application or plug-ins are required by some web browsers to accomplish one or more tasks. A browser, within this application, may also be referred to as a user agent 102.

The term impression can be used as a synonym for ad view, view, or ad space. Publishers offer and their customers buy advertising measured in terms of ad views or impressions. Since a single webpage can contain multiple ads (depending on its design), a site usually registers more ad views per unit of time than webpages per unit of time. The term page can refer to a webpage. Page can also refer to any type of display where ads may be placed. Pages can be positioned within standalone programs and are not limited to browsers.

Generally described, the present application discloses removing the inadequacies of serving advertisements in the previously presented environment. More specifically and with reference to FIG. 2, the present application relates to a system and method for optimizing advertisements served from multiple ad networks 106 using ad engine 112. The system and method manages a plurality of ad networks 106 through ad engine 112 so that webpage publishers can retrieve multiple ads from the plurality of ad networks 106 until an optimized ad can be displayed on their webpages. Preferably, but not limiting, optimal ads pay higher fees for ad space on the webpages. Provided herein are details for: (1) optimizing ad network tags corresponding to a plurality of ad networks 106; and (2) removing default advertisements from being served to a user 110.

Figure 2:
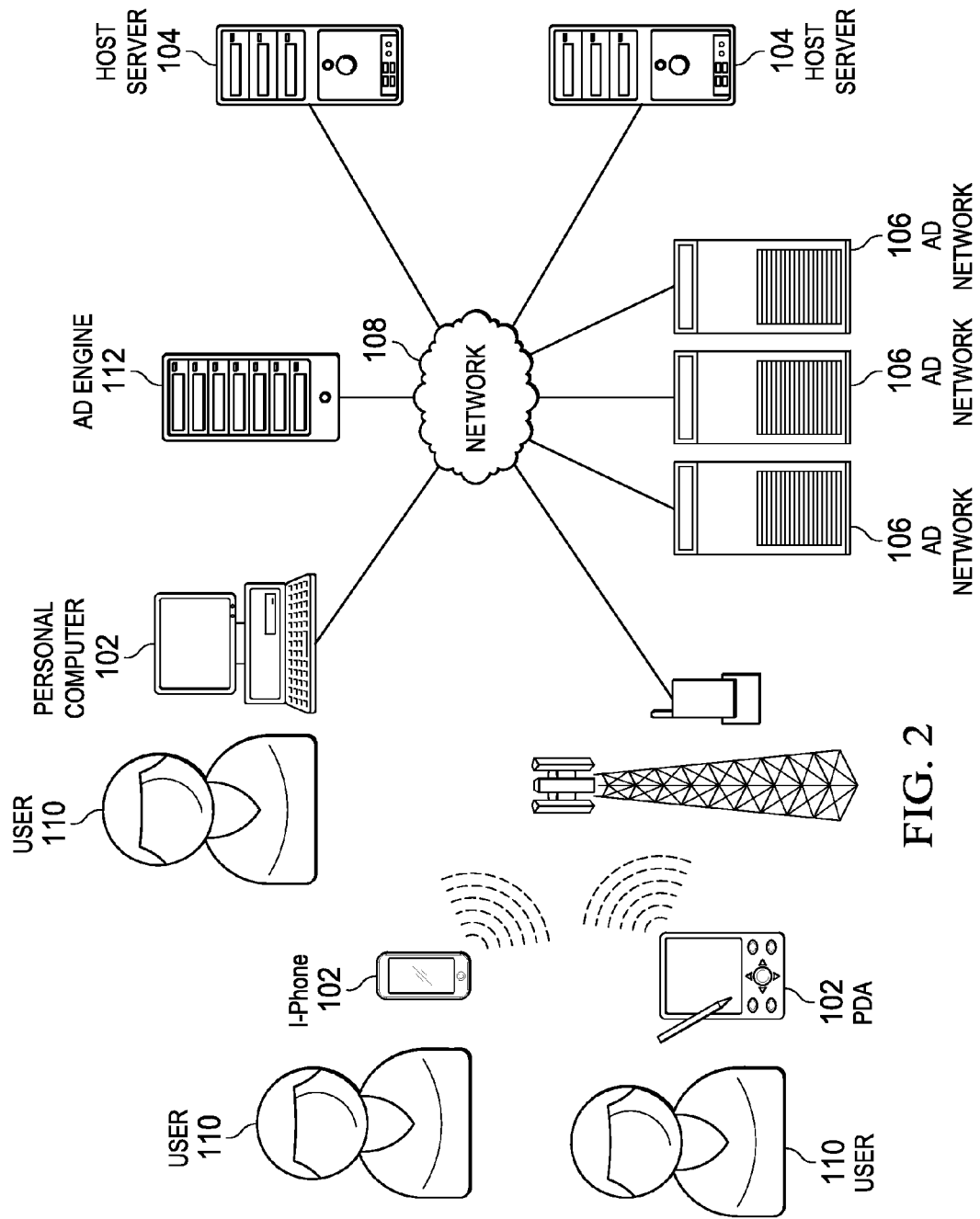
FIG. 2 is a diagram depicting an exemplary environment for an online ad system interacting with a plurality of advertisers in order to better serve user agents in accordance with one aspect of the present application, with details further elaborated in the following FIGURES.

In one illustrative embodiment of the present application, a system as shown in FIG. 2, includes an ad engine 112 which selects from a plurality of ad networks 106 ads to fill ad impressions on a webpage provided by host server 104 and displayed by a user agent 102. To fill the ad impressions, user agent 102 parses and renders a page, the page incorporating an ad tag causing the user agent 102 to request ad network information from ad engine 112 until optimized ads are found. The ad engine 112 is capable of receiving requests for ad network information and in response to each request for ad network information, ad engine 112 provides an ad network tag to the user agent 102, each ad network tag referencing an ad network 106. The user agent 102 receives the ad network tag and sends an ad request based on the ad network tag.

Continuing with the illustrative embodiment, the system further includes a plurality of ad networks 106 each corresponding to the ad network tags and capable of receiving the ad requests from the user agent 102. Each ad network 106 within the plurality of ad networks 106 serves default or non-default ads in response to ad requests from the user agent 102 until a qualified ad is obtained by the user agent 102 for each ad impression within the page. A qualified ad can be a non-default ad served from an ad network 106 within the plurality of ad networks 106. In addition, a qualified ad can be a default ad after a maximum number of ads from the plurality of ad networks 106 have been served or a default ad after a specific period of time elapses.

Ad engine 112 acts as a platform that web publishers use to interact with and manage multiple ad networks 106 simultaneously. In addition, ad engine 112 can optimize advertisements from the many ad networks 108 and consequently, many advertisers. Ad engine 112 provides quality ads that a publisher is comfortable with resulting in more clicks on those ads and consequently more money made.

Figure 3:
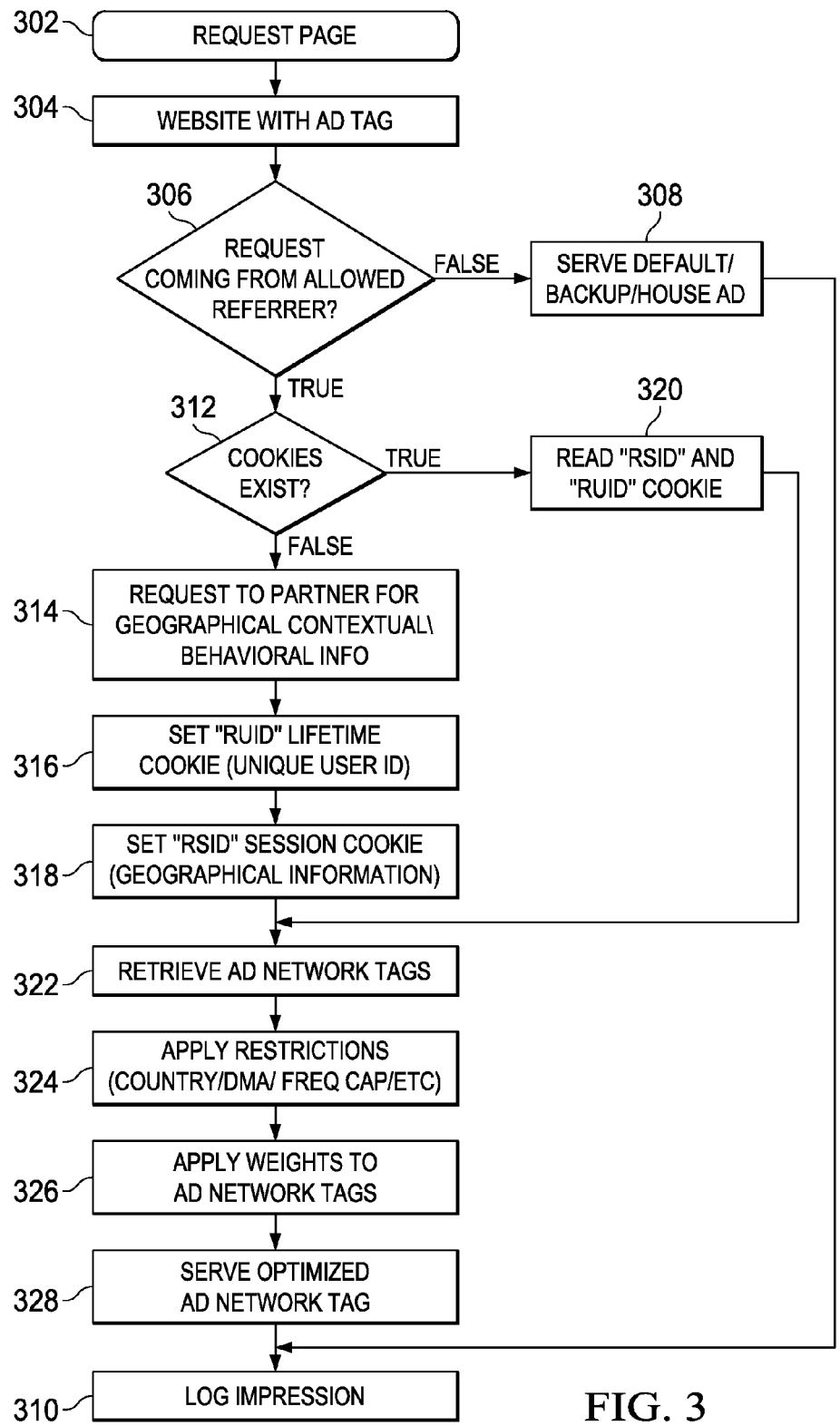
FIG. 3 depicts general processes performed by the online ad system to serve ad network tags in accordance with one aspect of the present application, with details further elaborated in the following FIGURES.

In another illustrative embodiment, and shown in FIG. 3, general processes by components within the system for selecting and serving an optimized ad network tag associated with an ad network 106 are presented. Beginning at block 302, user agent 102 makes a request for a webpage from host server 104. In response, at block 304, host server 104 provides a webpage with an ad tag. The ad tag is typically a small piece of code that directs user agent 102 to go to ad engine 112 for ad network tags to fill ad impressions.

After parsing the webpage from host server 104 and recognizing that an ad tag is within the webpage, user agent 102 requests for an ad network tag from ad engine 112. At decision block 306, ad engine 112 determines whether the request is coming from an allowed referrer, one who has agreed to serve advertisements using ad engine 112. When the request is not from an allowed referrer, ad engine 112 serves a default, backup, or house ad to user agent 102 at block 308. At block 310, the ad is logged in for future reference.

When the request is from an allowed referrer, ad engine 112 determines whether cookies exist on user agent 102 at decision block 312. In alternative embodiments, ad engine 112 determines whether an object exists on user agent 102. Continuing with FIG. 3, ad engine 112 requests from a partner geographical, contextual, and behavioral information at block 314 when there are no cookies set on user agent 102. At block 316, a real user identification (RUID) cookie can be set on user agent 102. At block 318, a real session identification (RSID) cookie can be set on user agent 102. The process can proceed at block 322, which is described below.

Returning to decision block 312, ad engine 112 retrieves previously stored cookies, including RUID and RSID cookies, at block 320 if there are set cookies on user agent 102. At block 322, ad engine 112 retrieves ad network tags. Restrictions are applied to the ad network tags at block 324, which can include restrictions based on country, DMA, frequency caps, etc. At block 326, weights are applied to the restricted ad network tags. In turn, ad engine 112 serves an optimized ad network tag to user agent 102 and the ad is logged in for future reference at block 310.

Figure 4:
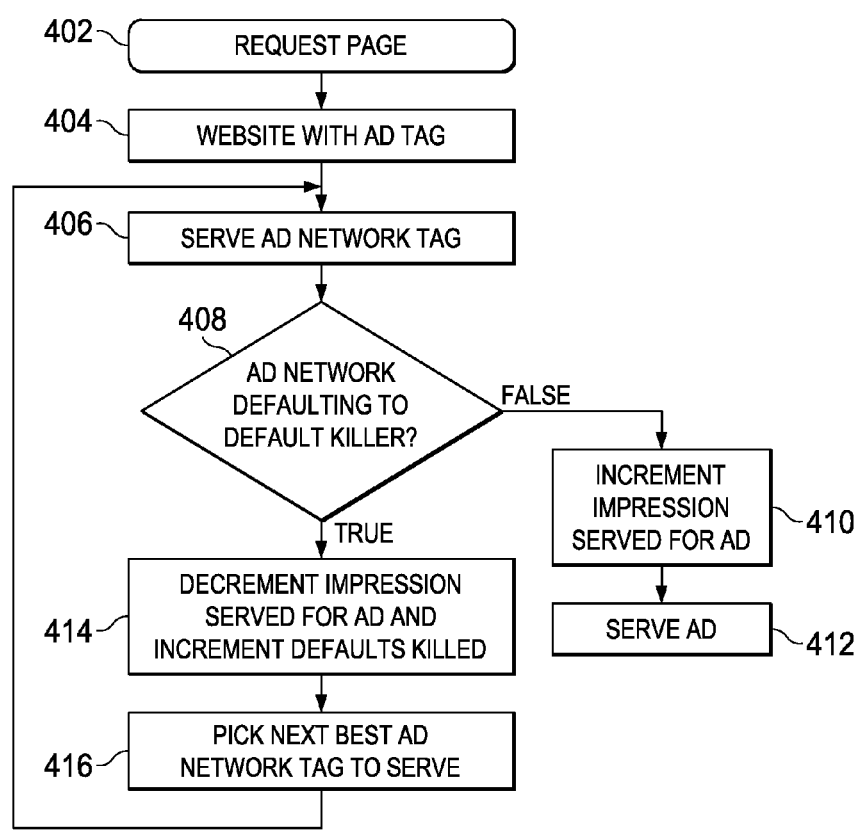
FIG. 4 illustrates general processes by the online ad system for removing default advertisements in accordance with one aspect of the present application, with details further elaborated in the following FIGURES.

In another illustrative embodiment shown in FIG. 4, general process by components with the system for removing default or low paying ads served by a selected ad network 106 and referenced by an optimized ad network tag are presented. Beginning at block 402, user agent 102 makes a request for a webpage from host server 104. In response, at block 404, host server 104 provides a webpage with an ad tag. The ad tag within the page causes ad engine 112 to serve up an ad network tag at block 406 as shown in FIG. 3.

After receiving the ad network tag, user agent 102 makes a request for an ad to the ad network 106 associated with the ad network tag. In turn, ad network 106 responds with a default or non-default ad, a determination made at decision block 408. When user agent 102 receives a non-default ad, an impression counter is incremented at block 410 and the ad is served at block 412. Alternatively, the impression counter is decremented and a default counter is incremented at block 414. At block 416, user agent 102 requests for another ad network tag from ad engine 112 and the process continues at block 406 whereby the search for a qualified ad continues. In another embodiment, based on the number of impressions served, ad engine 112 determines whether to serve another ad network tag or just serve a default, backup, or house ad.

Ad engine 112 reduces the instances where a default ad is served, thereby increasing efficiency. Ad engine 112 can also provide statistical information and report the information to the webpage publisher. This information can include the number of defaults that were avoided. The method increases or optimizes efficiency in eliminating defaults by sending requests to ad networks 106 in an intelligent order of priority to find a qualified advertisement quickly.

Distinguished from the environment provided in FIG. 1, the illustrative embodiments provided in FIGS. 2, 3, and 4 remove the restriction of a webpage publisher contracting with only one ad network 106 when another advertiser who would offer the webpage publisher a higher fee for their ad space. In addition, ad engine 112 aggregates stats and other data for a webpage publisher and decides how and when to place ads from each individual ad network 106 on the publisher's webpage. Ad engine 112 can track ad network 106 performances by demographic, geographic location, context, etc.

Throughout the present application, ad engine 112 may be referred to as the "Rubicon Project", "Rubicon", or some derivative thereof. Rubicon, at least partially, increases the efficiency of the ads ultimately served to viewers of webpages. When a request is made by a webpage for an ad, Rubicon receives the request and then administers the transmission of an appropriate, or more appropriate, ad through an ad network tag for the webpage involved. This can occur by knowing information about the webpage publisher and/or the requesting webpage, possibly in a database entry indicating several different and relevant aspects of the publisher, the webpage or by information transmitted by the webpage itself By matching these indicators from the database entry and/or webpage with ads offered by the individual ad networks 106 of Rubicon, it becomes easier and (for the publisher) possibly more lucrative to present the webpage viewer with ads relevant to the webpage while simultaneously avoiding the publication of default ads that may bear little or no relevance to the content of the webpage being viewed.

As shown in the illustrative embodiments above, ad engine 112 can report to webpage publishers on a periodic basis. These reports can include information such as impressions and estimated clicks by date, by ad size, by ad type, by ad network, and by geography, are all with customizable date rangers. Charts illustrating the reporting data can be made and exportable to Excel™ from Microsoft™.

Another benefit allows consolidated payments to webpage publishers. These payouts can be provided in a single check with payments to publishers generally being made within forty-five days. Alternatively, payments can be made at any time publishers desire.

Typically, Rubicon provides full access to all features. In one embodiment, Rubicon can charge publishers fifteen percent of any income generated from the multiple ad networks 106 served through ad engine 112. Alternatively, Rubicon can charge ten percent.

Ad engine 112 may also test text color and background color for combinations of text ads. Ad engine 112 can also test ad locations on a webpage of a publisher. Furthermore, ad engine 112 does not require publishers on host server 104 to bring in any of their own ad networks 106. Ad engine 112 automatically signs the webpage publisher up for multiple ad networks 106 that fit the publisher's website requirements.

Figure 5:
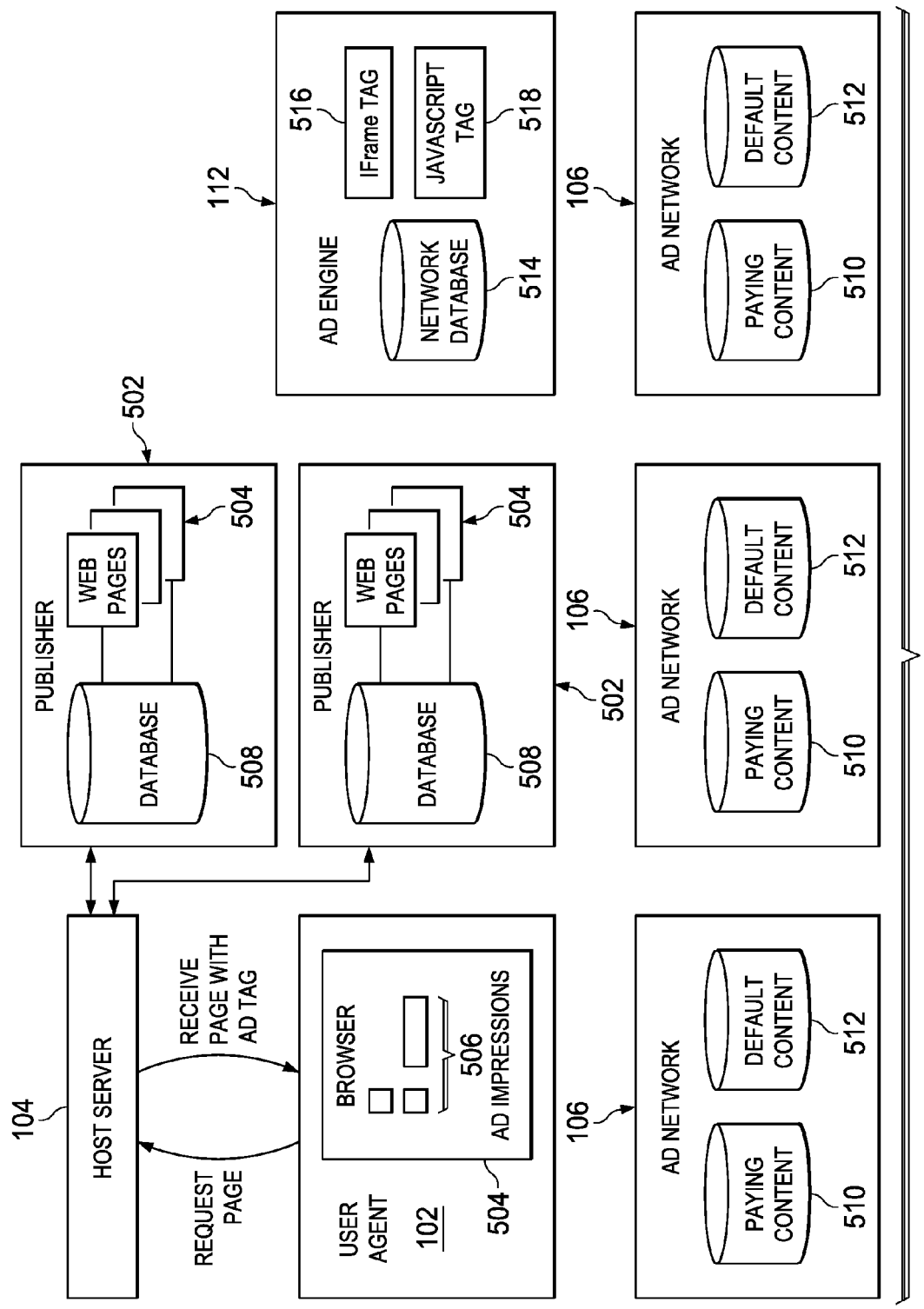
FIG. 5 diagrams typical interactions between the user agent, host server, and publishers for retrieving and displaying advertisements within ad impressions on a page displayed by a browser in accordance with one aspect of the present application.

Above, general descriptions contained within illustrative embodiments were provided. With reference now to more specific features, FIG. 5 illustrates typical interactions between user agent 102, host server 104, and publishers 502 for retrieving and displaying advertisements, the advertisements typically shown within ad impressions 506 on webpage 504 displayed by a browser.

As shown, user agent 102 often begins by making a request for a webpage 504 from host server 104. In response to the request, host server 104 provides a webpage 504. Generally, webpage 504 includes an ad tag. The ad tag represents to the user agent 102 that the webpage publisher 502 is associated with the Rubicon Project. When parsed by user agent 102, the ad tag points to ad engine 112 where user agent 102 can locate ad network tags, each ad network tag associated with an ad network 106.

When webpage 504 does not incorporate an ad tag, however, user agent 102 can retrieve ads in the previous way illustrated in FIG. 1. In the illustration, generally an ad network tag is already provided for in webpage 504. The ad network tag would direct user agent 102 to locate ads through the ad network 106 directly associated with the ad network tag in webpage 504. As presented above, an ad network tag already emplaced within webpage 504 would provide ineffective and inefficient results.

In some instances, webpage publishers 502 may try to take advantage of the Rubicon Project by placing ad tags within their webpages 504 without becoming an allowed referrer. To ensure that the webpage publisher's 502 ad tags are associated with the Rubicon Project, ad engine 112 can verify the publishers 502 and their ad tags. Publisher 502 information can be stored on a database on ad engine 112. In those instances where publisher 502 is not an allowed referrer, ad engine 112 can typically provide a default, backup, or house ad to user agent 102.

Returning to FIG. 5, multiple publishers 502 can be associated with host server 104. Internally, each publisher 502 can include a database filled with multiple webpages 504. These webpages 504 can incorporate a variety of topics such as sports, business, and politics. As presented and preferable in this application, webpages 504 can include a variety of ad impressions 506.

As shown, two publishers 502 in the illustration send webpages 504 to host server 104. In other embodiments, three or more publishers 502 can send webpages 504. Still yet, a single webpage publisher 502 can send webpages to host server 104. Dependent on operational capacities, host server 104 can receive and distribute webpages 504 from a large amount of publishers 502.

With reference now to other components within FIG. 5, the system can include ad networks 106 and ad engine 112. Typically, each ad network 106 maintains at least two databases: a paying content database 510 and a default content database 512. Paying content database 510 stores ads that provide revenue for the webpage publisher 502 when displayed on user agent 102. Contrawise, default content database 512 stores ads that do not pay or pay very little when displayed on user agent 102.

Continuing, in typical embodiments of ad engine 112, a network database 514 is included. Network database 514 can maintain user, ad, size, optimization, and statistical information. In addition, ad engine 112 can include IFrame tags 516 and JavaScript tags 518. Because both ad networks 106 and ad engine 112 were not involved in any interactions within FIG. 5, few details were provided therein. However, and as will become apparent, more details are provided in the following FIGURES.

After webpage 504 has been received, with webpage 504 incorporating an ad tag, user agent 102 requests for an ad network tag from ad engine 112. The ad tag directs user agent 102 to query ad engine 112 for an ad network tag. In the multiple embodiments provided in FIGS. 6A, 6B, 6C, 6D, and 6E, illustrations representing processes taken by ad engine 112 to return a suitable ad network tag to user agent 102 are presented. In each of the illustrations, ad engine 112 applies a series of optimization techniques and algorithms to select a qualified ad.

Figure 6A:
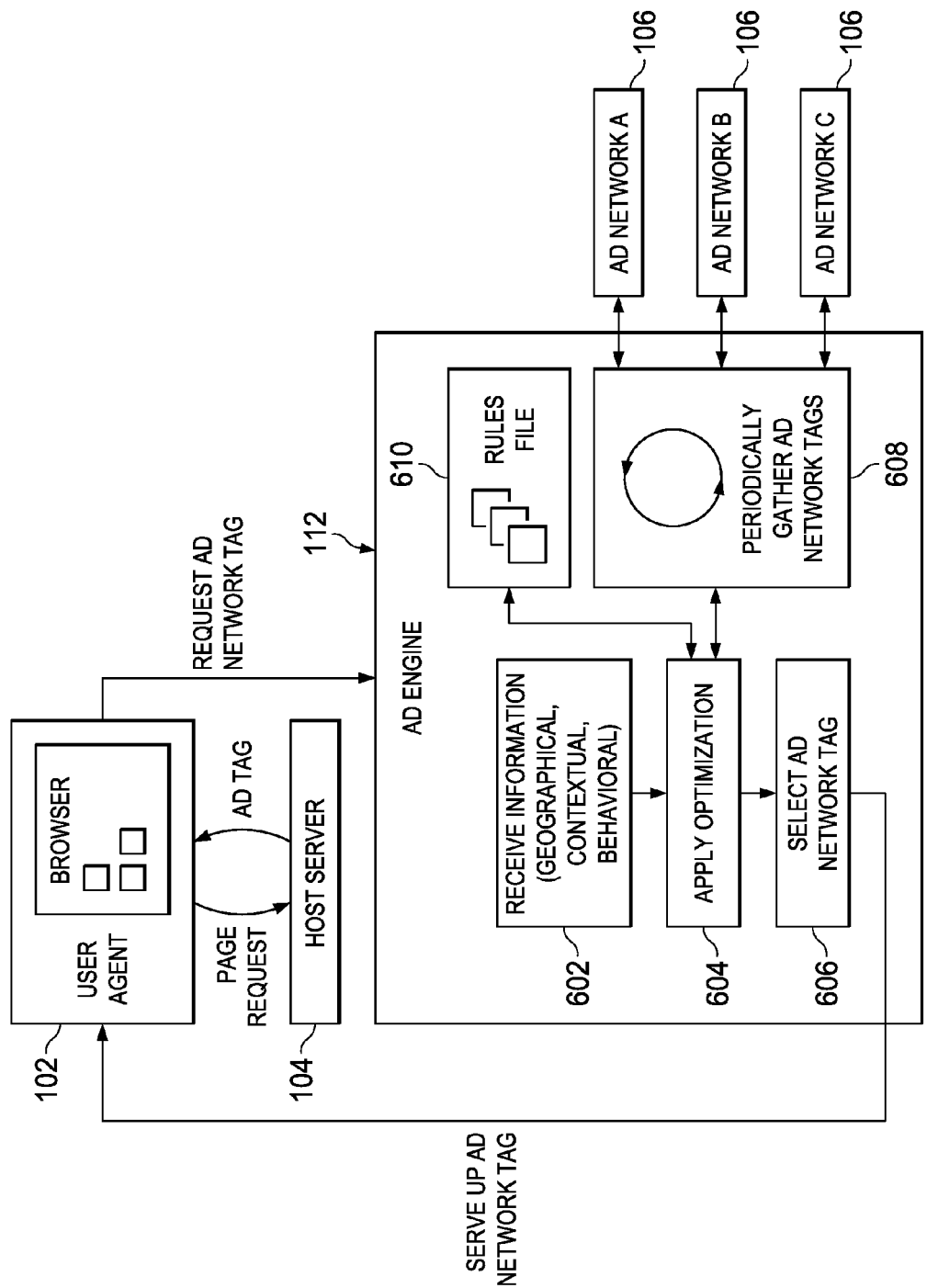
FIGS. 6A, 6B, 6C, 6D, and 6E describe multiple embodiments wherein requests for ad network tags are fulfilled by the ad engine using a series of optimization techniques and selection algorithms in accordance with one aspect of the present application.

In the first embodiment, shown in FIG. 6A, ad engine 112 periodically gathers ad network tags and when requested, sends an optimized ad network tag from the periodically gathered ad network tags to the requesting user agent 102. As shown in the previous FIGURES, initially, user agent 102 makes a request for a webpage 504 from host server 104. In response, host server 104 provides webpage 504 with an ad tag to user agent 102, the ad tag directing user agent 102 to query ad engine 112 for an ad network tag. A request for an ad network tag is then made to ad engine 112 by user agent 102.

Ad engine 112, in a separate process at block 608, periodically gathers a set of ad network tags each tag associated with an ad network 106. In the shown embodiment, ad engine 112 gathers ad network tags from ad network A 106, ad network B 106, and ad network C 106. In other embodiments, ad engine 112 gathers ad network tags from at least one ad network 106. One skilled in the relevant art will appreciate that any number of ad networks 106 can be connected to ad engine 112 either directly or indirectly via network 108. While ad network A 106, ad network B 106, and ad network C 106 appear to be only connected with ad engine 112, the ad networks 106 can supply information to multiple ad engines 112 or user agents 102.

As shown ad network tags are gathered on ad engine 112. Alternatively, and in other embodiments, ad network tags 106 can be gathered outside of ad engine 112 on a separate database. Furthermore, ad network tags can be gathered weekly, daily, hourly, or at any other period of time. Preferably, however, ad network tags are gathered often to provide the latest ads to users 110. In other embodiments, ad network tags can be updated by the ad networks 106 when new ads are received.

After receiving a request from user agent 102, ad engine 112 receives information from user agent 102 at block 602. This information can include geographical information contextual information, behavioral information, etc. Geographical information typically refers to the physical location of user 110. Geographical information can include the country, region, state, city, metro code, zip code, organization, Internet Protocol (IP) address, ISP, or other criteria of the user 110.

Contextual information refers to the content displayed on webpage 504. The information is specific to the individual site that user 110 is looking at. Typically, text within webpage 504 is scanned for keywords. Behavioral information generally refers to the user's 110 web browsing behavior. Behavioral information can include sites the user has visited, searches they have made, and links on the sites the user 110 has selected. By using this information, ad engine 112 can increase its effectiveness by searching for ad networks that are more likely to be influential based on the user's 110 past behaviors. Other user information can include demographical information. This information focuses on the makeup of users 110 such as age, sex, religion, etc.

At block 604, the periodically gathered set of ad network tags are optimized. The tags are ranked using a set of rules 610 and the user information received from the user agent 102. Once the ad network tags are ranked, an ad network tag is selected at block 606. In turn, the selected ad network tag is served in response to the request from user agent 102.

Figure 6B:
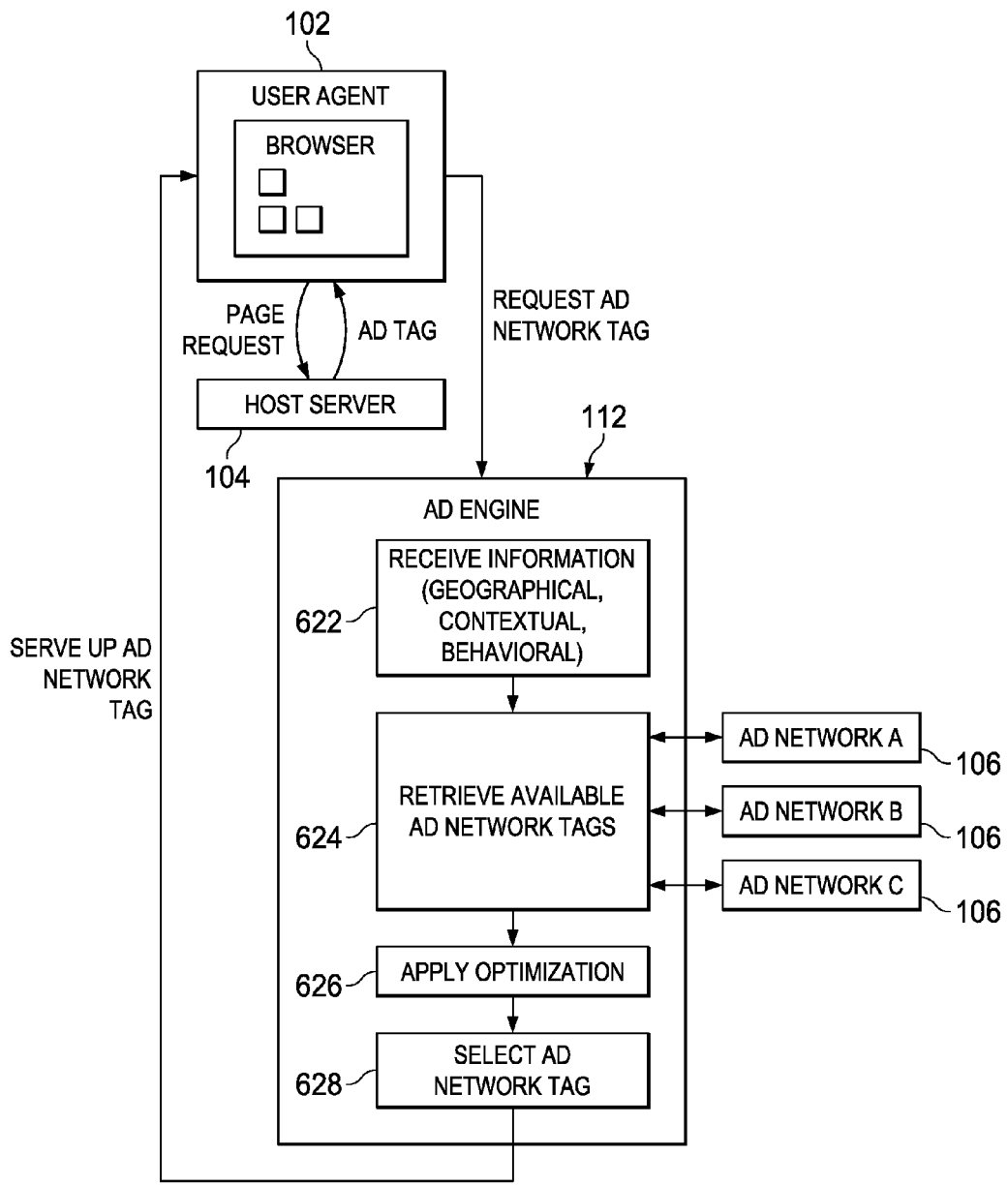

In a second embodiment, shown in FIG. 6B, ad engine 112 gathers ad network tags at runtime, instead of periodically, optimizes the ad network tags, and selects and sends an ad network tag from the optimized ad network tags to the requesting user agent 102. Initially, user agent 102 makes a request for a webpage 504 from host server 104. In response, host server 104 provides webpage 504 with an ad tag to user agent 102, the ad tag directing user agent 102 to query ad engine 112 for an ad network tag. A request for an ad network tag is then made to ad engine 112 by user agent 102.

After receiving a request from user agent 102, ad engine 112 receives information from user agent 102 at block 622. This information can include geographical information, contextual information, behavioral information, etc. At block 624, available ad network tags are retrieved from at least one ad network 106. As shown, ad network A 106, ad network B 106, and ad network C 106 are queried.

In turn, the ad network tags are optimized by ranking them using a set of rules and the user information from user agent 102 at block 626. Ad engine 112 selects an ad network tag from the optimized set of ad network tags at block 628. The selected ad network tag is served in response to the request from user agent 102.

Figure 6C:
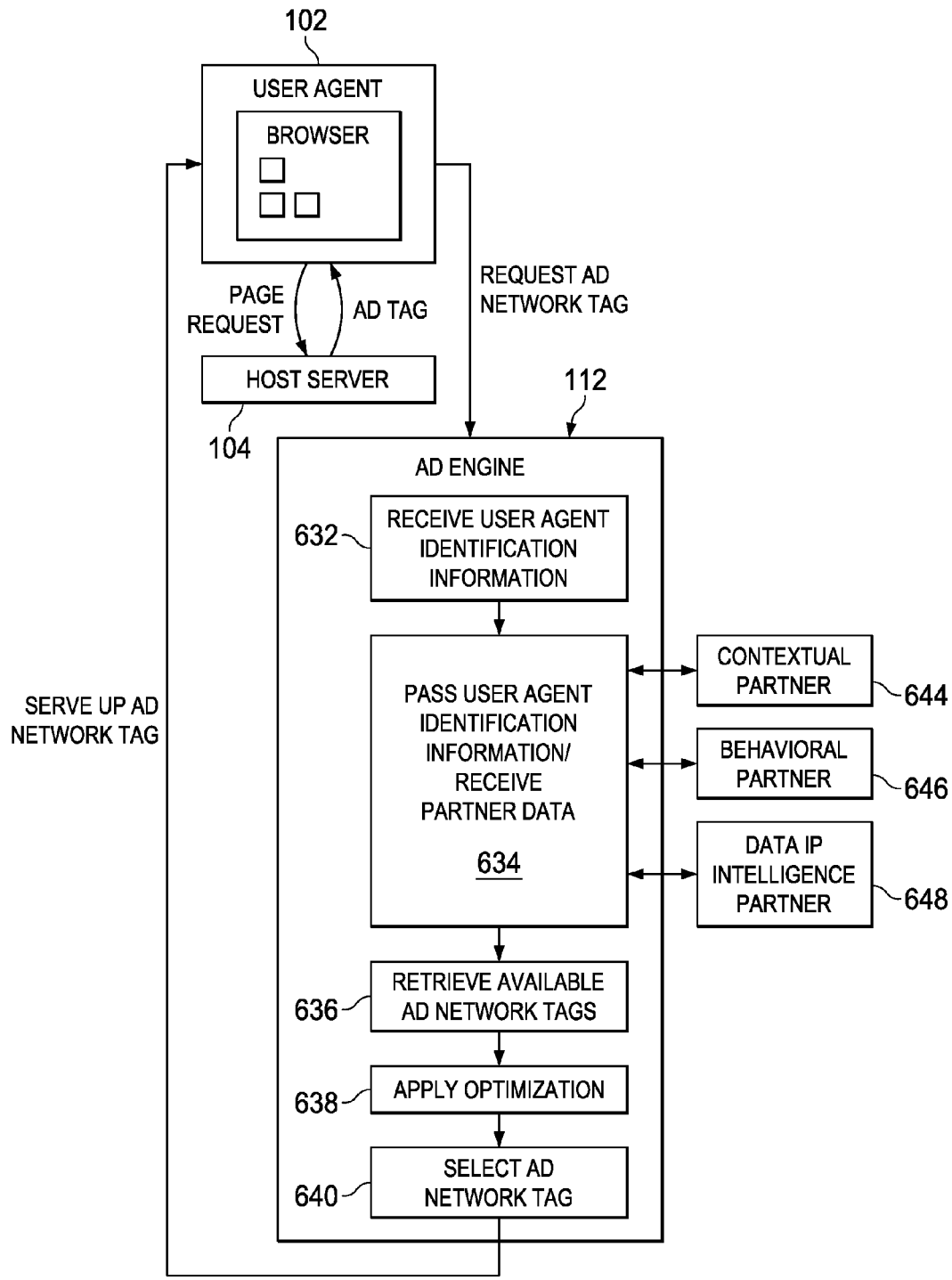

In a third embodiment, ad engine 112 receives user information, passes the information to a plurality of partners, and in response, the partners provide partner data for use by the ad engine 112 to optimize a set of ad network tags as shown in FIG. 6C. Initially, user agent 102 makes a request for a webpage 504 from host server 104. In response, host server 104 provides webpage 504 with an ad tag to user agent 102, the ad tag directing user agent 102 to query ad engine 112 for an ad network tag. A request for an ad network tag is then made to ad engine 112 by user agent 102.

After receiving a request from user agent 102, ad engine 112 receives user agent identification information from user agent 102 at block 632. At block 634, ad engine 112 passes the user agent identification information to partners. These partners can include a contextual partner 644, behavioral partner 646, and geographical partner 648. In response, the partner can provide partner data based on the user agent identification information.

At block 636, ad engine 112 retrieves available ad network tags. In turn, the ad network tags are optimized by ranking them using a set of rules and the partner data at block 638. Ad engine 112 selects an ad network tag from the optimized set of ad network tags at block 640. The selected ad network tag is served in response to the request from user agent 102.

Figure 6D:
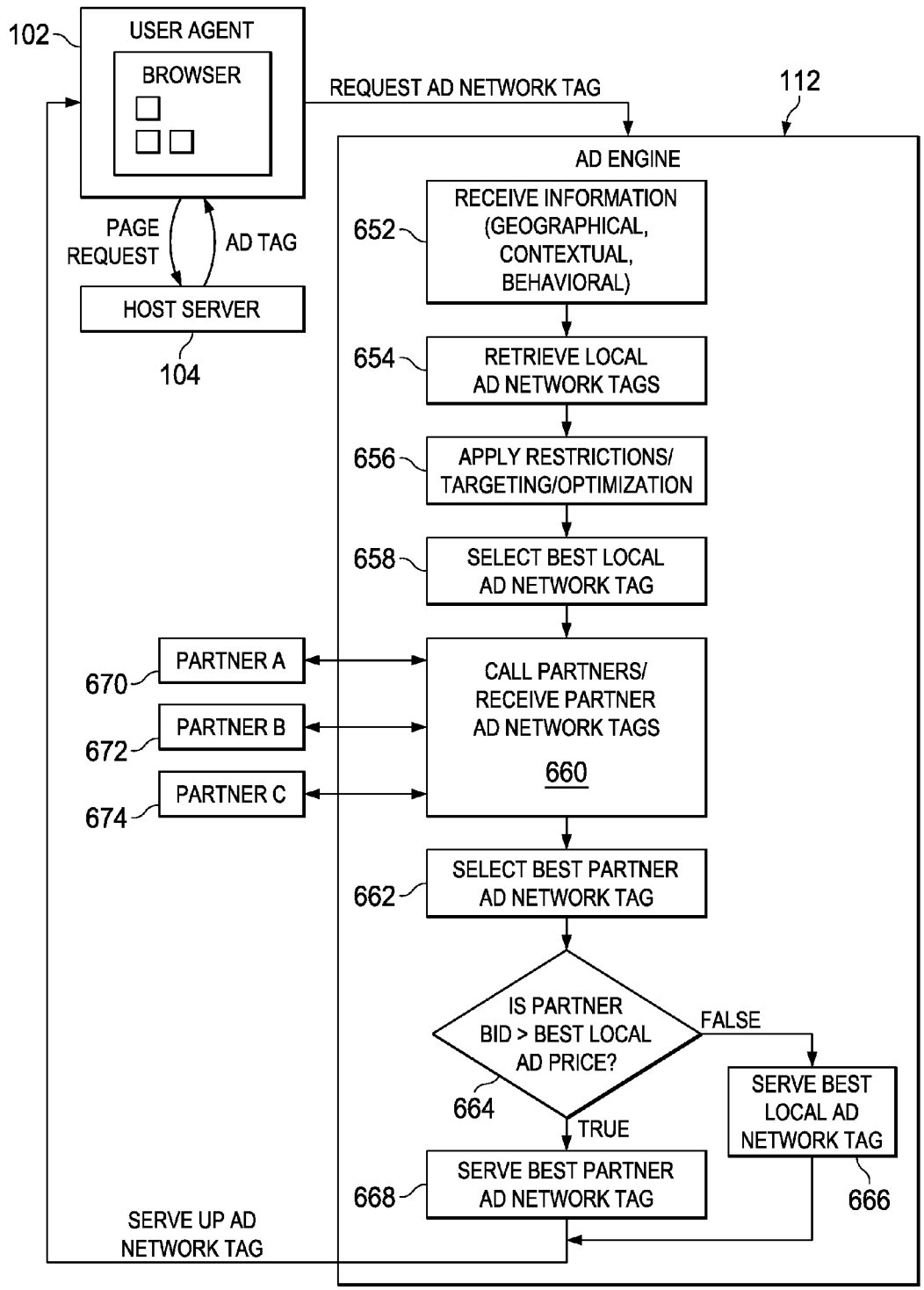

In a fourth embodiment, as shown in FIG. 6D, ad engine 112 selects between partner ad network tags and local ad network tags to provide user agent 102 with the best ad network tag capable of providing the highest revenue for webpage publisher 502. Initially, user agent 102 makes a request for a webpage 504 from host server 104. In response, host server 104 provides webpage 504 with an ad tag to user agent 102, the ad tag directing user agent 102 to query ad engine 112 for an ad network tag. A request for an ad network tag is then made to ad engine 112 by user agent 102.

After receiving a request from user agent 102, ad engine 112 receives information from user agent 102 at block 652. This information can include geographical information, contextual information, behavioral information, etc. At block 654, ad engine 112 retrieves local ad network tags. The local ad network tags are restricted, targeted, and optimized at block 656. Ad engine 112 then selects the best local ad network tag at block 658. Generally this is based on the highest revenue generation for the webpage publisher 502.

At block 660, ad engine 112 calls at least one partner for partner ad network tags. As shown in FIG. 6D, partner A 668, partner B 670, and partner C 672 are called. These partners are distinguished from those presented in FIG. 6C. Instead of providing geographical, contextual, and behavioral information, these partners provide bids for ad impressions 506 on webpage 504 in the form of partner ad network tags. Ad engine 112 then selects the best partner ad network tag at block 662. Generally this is based on the highest revenue generation for the webpage publisher 502.

Ad engine 112, at decision block 664, makes a determination on whether the partner bid is greater than the best local ad price based on the ad network tags. At block 666, ad engine 112 serves the local ad network tag to user agent 102 when the local ad network tag provides a better price than the partner ad network tag. Otherwise, ad engine 112 serves the partner ad network tag to user agent 102 at block 668 when the partner ad network tag provides a better price than the local ad network tag.

Figure 6E:
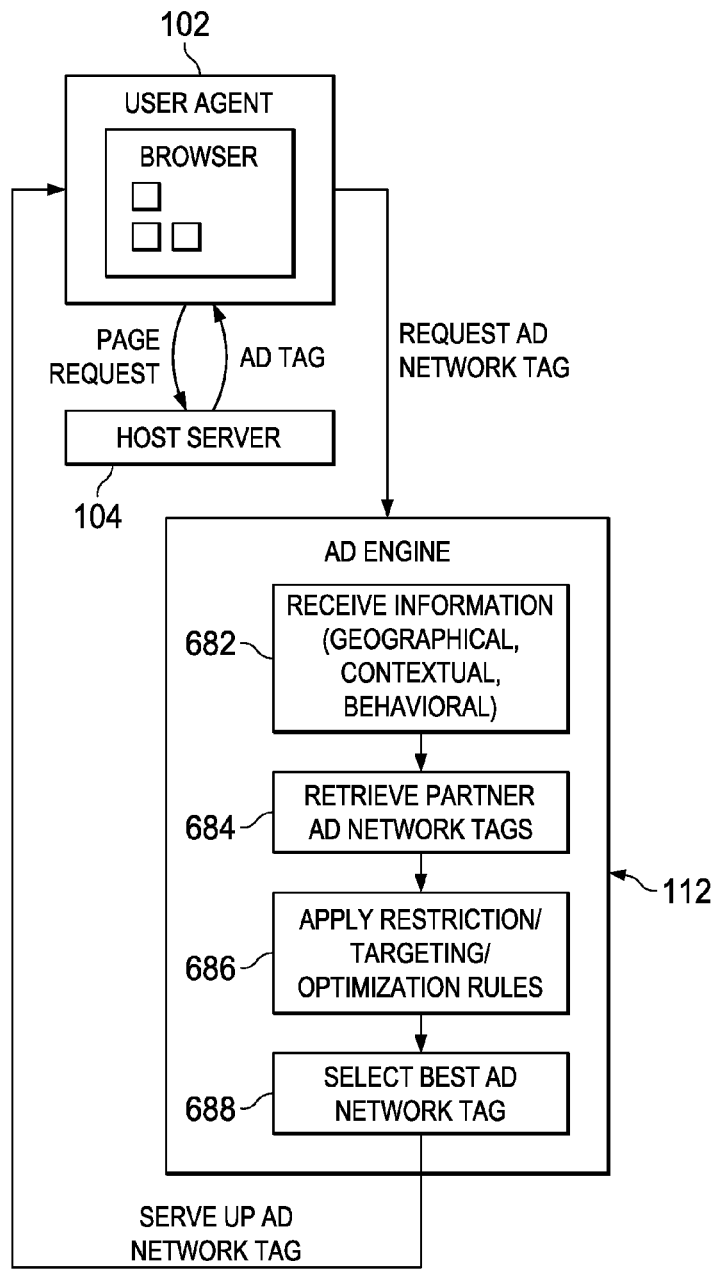

In a fifth embodiment, ad engine 112 selects the best ad network tag or bid from multiple partners as shown in FIG. 6E. Initially, user agent 102 makes a request for a webpage 504 from host server 104. In response, host server 104 provides webpage 504 with an ad tag to user agent 102, the ad tag directing user agent 102 to query ad engine 112 for an ad network tag. A request for an ad network tag is then made to ad engine 112 by user agent 102.

After receiving a request from user agent 102, ad engine 112 receives information from user agent 102 at block 682. This information can include geographical information, contextual information, behavioral information, etc. At block 684, partner ad network tags are retrieved. The ad network tags are restricted, targeted and optimized at block 686. An ad network tag is selected at block 688 and served in response to the request from the user agent 102.

While multiple embodiments for serving ad network tags have been provided, one skilled in the relevant art will appreciate that any combination of elements provided within the embodiments are still within the scope of the present application. Furthermore, implementations involving changes to the order or minor variations thereof are provided herein.

Within each embodiment provided for in FIGS. 6A, 6B, 6C, 6D, and 6E, the set of rules used to optimize the ad network tags can vary. In one embodiment, ad engine 112 can apply a different weight for each ad network tag. These weights can be assigned to the ad network tags based on user information from the user agent 102 or partner data. In other embodiments, the set of rules eliminate previously seen ad network tags.

Figure 7A:
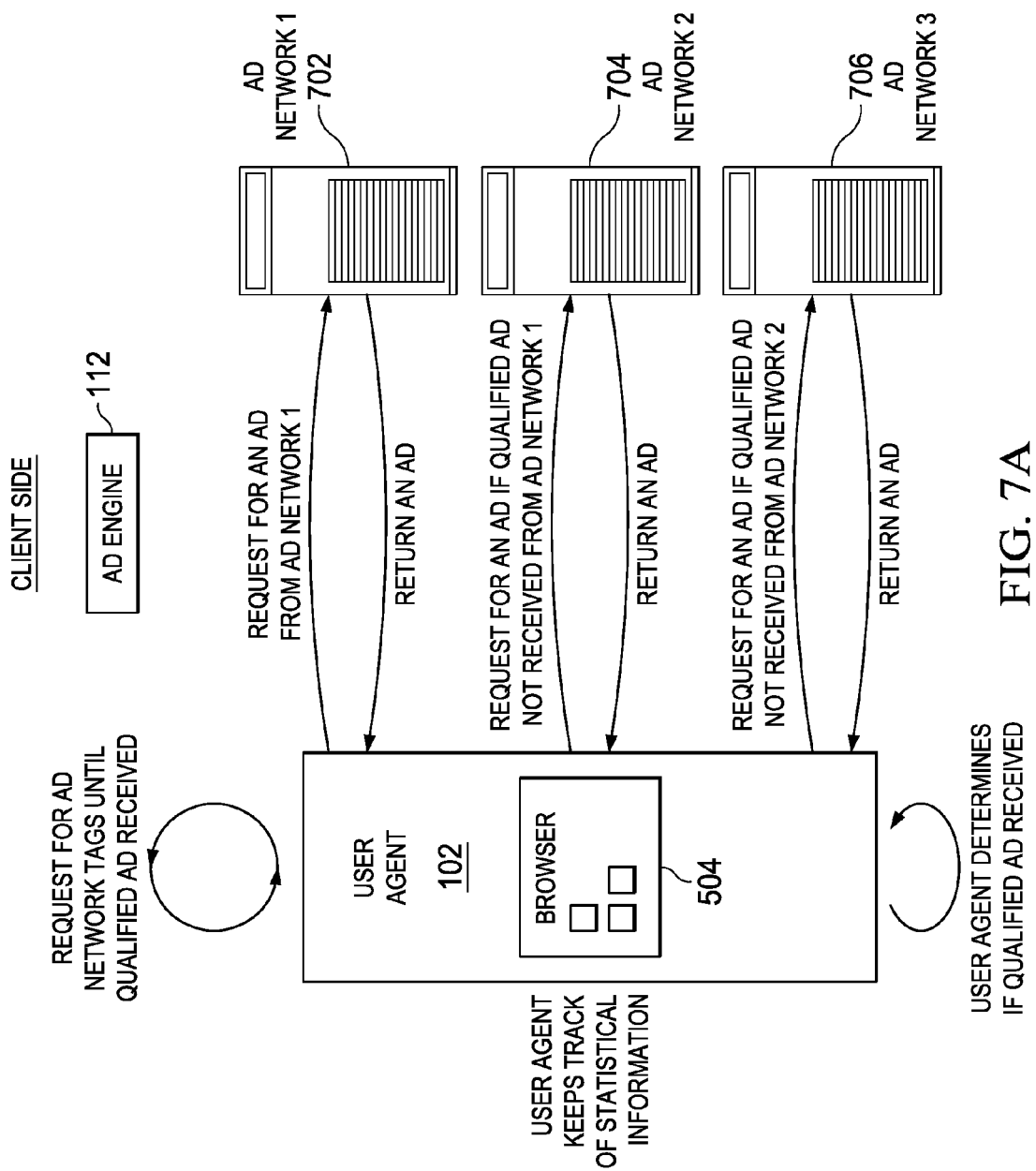
FIGS. 7A and 7B diagram exemplary client-side and server-side architectures for requesting and receiving advertisements from multiple ad networks in accordance with one aspect of the present application.
Figure 7B:
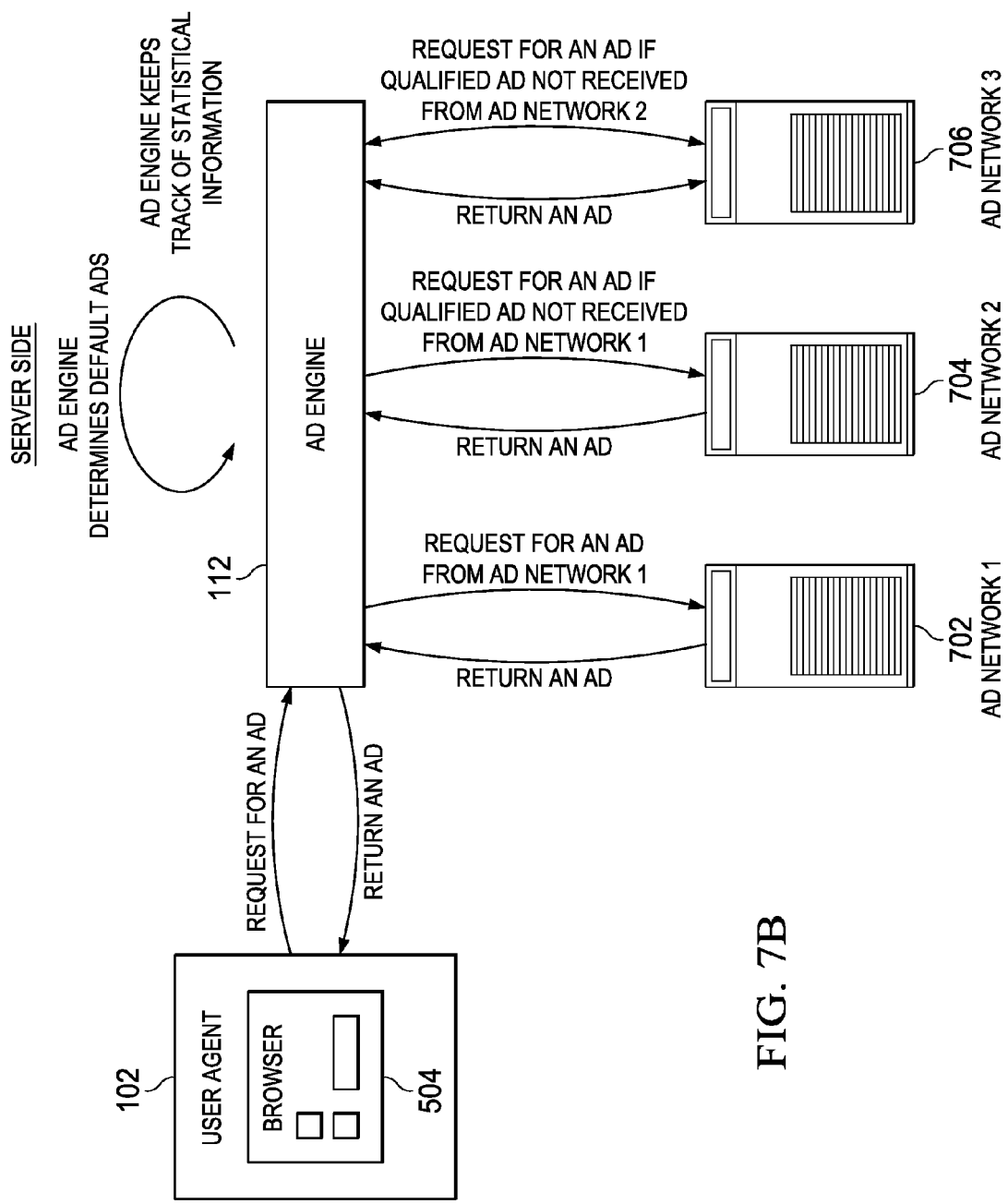

After requesting for an ad network tag, user agent 102 receives an optimized ad network tag from ad engine 112. However, the ad network tag selected by ad engine 112 does not guarantee that a non-default ad will be served by the ad network 106 referenced by the ad network tag. Therefore, and as indicated in the second portion of the present application, a default ad remover—also known as a default killer—is presented. FIGS. 7A and 7B include exemplary client-side and server-side architectures for removing default ads.

In a preferred embodiment shown in FIG. 7A, user agent 102 keeps track of statistical information and makes determinations about default ads. In this embodiment, user agent 102 begins by sending a request for an ad network tag to an ad engine 112 to fill ad impressions 506 on webpage 504. In turn, ad engine 112 returns an ad network tag referring to ad network 1 702 to user agent 102. Preferably, and if possible, ad engine 112 uses information provided from user agent 102 to select the first ad network tag. This information can be stored on user agent 102 as cookies or objects. Using the ad network tag received from ad engine 112, user agent 102 requests for an ad from ad network 1 702. In response, ad network 1 702 serves an ad to user agent 102.

After receiving the ad from ad network 1 702, user agent 102 determines whether a qualified ad has been received. Typically, ad engine 112 places JavaScript code or cookies on user agent 102 for this to happen. After receiving a default ad from ad network 1 702, user agent 102 makes an additional request for a second network tag from ad engine 112. In turn, ad engine 112 responds with a second ad network tag referencing ad network 2 704. Preferably, ad engine 112 uses information provided from user agent 102 to select the second ad network tag.

Continuing, user agent 102 requests for an ad from ad network 2 704. In response, ad network 2 704 returns a second ad to user agent 102. After receiving a default ad from ad network 2 704, user agent 102 makes a third request for an ad network tag from ad engine 112. Ad engine 112 responds with a third ad network tag associated with ad network 3 706. Again, ad engine 112 can user information provided from user agent 102 to select the third ad network tag.

After receiving the third ad network tag, user agent 102 requests for an ad from ad network 3 706. In response, ad network 3 706 returns a third ad to user agent 102. The process continues until a non-default ad is received, a maximum number of ad networks 106 have been queried, or a certain period of time has elapsed. While only three ad networks 106 have been shown, additional ad networks 106 can be queried.

In an alternative embodiment, FIG. 7B provides a server side architecture wherein ad engine 112 keeps track of statistical information and makes determinations about default ads. Initially, user agent 102 makes a request for an ad from ad engine 112 to fill ad impressions 506 on webpage 504. Ad engine 112 responds with requesting for an ad from ad network 1 702 directly. In turn, ad network 702 responds with returning an ad to ad engine 112. Ad engine 112 then determines whether a qualified ad has been received.

After receiving a default ad from ad network 1 702, ad engine 112 makes an additional request for an ad from ad network 2 704. Preferably, ad engine 112 uses previously saved information to select a new ad network 106. In turn, ad network 2 704 responds with a second ad. After receiving a default ad from ad network 2 704, ad engine 112 makes a third request for an ad from ad network 3 706.

In response, ad network 3 706 responds with a third ad. Again, ad engine 112 can use previously saved information to select a new ad network 106. The process continues until a non-default ad is received, a maximum number of ad networks 106 have been queried, or a certain period of time has elapsed. While only three ad networks 106 have been shown, additional ad networks 106 can be queried.

FIGS. 7A and 7B provided exemplary architectures wherein multiple ad networks 106 were queried for ads. In these embodiments, each ad network 106 provided a different ad. In other embodiments, the same ad network 106 may provide different ads using additional information, the additional information including any previously seen ads.

Figure 8:
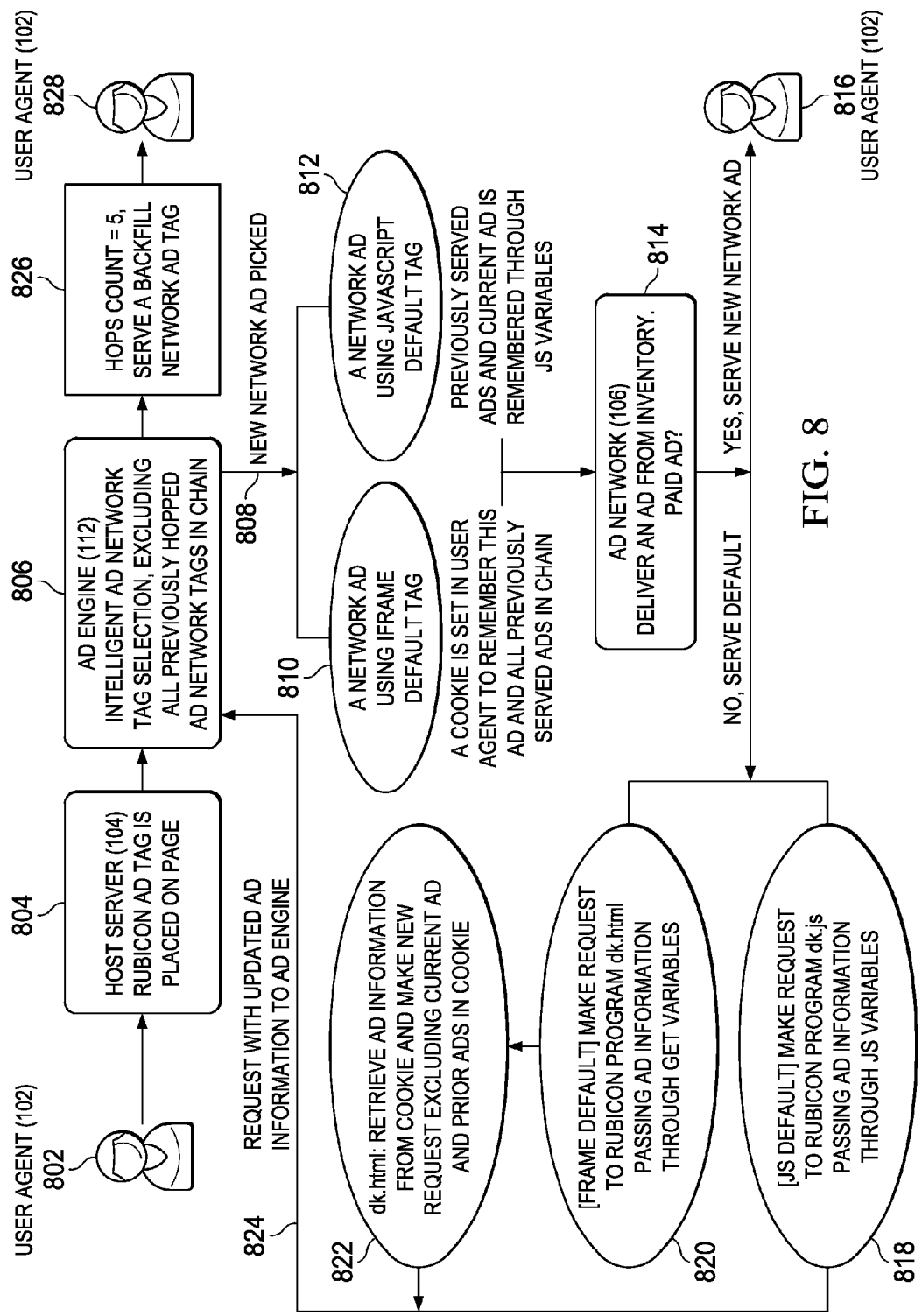
FIG. 8 illustrates processes performed by each component within the system for distributing a qualified ad that maximizes advertisement revenue for a webpage publisher in accordance with one aspect of the present application.

With reference now to FIG. 8, a general layout illustrating processes performed by each component within the system for removing default ads and distributing a qualified ad that maximizes advertisement revenue is presented. Beginning at section 802, a user 110 operating agent 102 views a publisher's webpage 504 from host server 104. On the page 504 are ad impressions 506. As the page 504 is being parsed and rendered on user agent 102, an ad tag, as shown in section 804, in the publisher's page 504, directs the user's 110 web browser to communicate with ad engine 112, instead of an ad network 106.

At section 806, ad engine 112 makes a decision about which ad network 106 to request an ad from. Once the ad engine 112 has selected an ad network 106 at section 808, the ad engine 112 passes the request to the selected ad network 106. The ad network 106 can review information in this request such as the type of page 504 the ad is to be on, the size of advertisement requested, etc. The ad network 106 sends an ad to the viewer's web browser, which is then evaluated on user agent 102.

When a request is made by user agent 102 to retrieve an advertisement, the ad network 106 may not have an advertisement that matches the website's page 504. The ad may not match for many reasons including not matching the content of the page 504, or meeting the publisher's minimum CPM/cost-per-thousand requirement. Instead, the ad network 106 serves a default ad which often has nothing to do with the webpage 504. In such instances, the fee earned by webpage publisher 502 for that ad is greatly diminished, and is often zero. Eliminating default ads bring more revenue to the publisher and remove some of the inefficiencies in today's online ad market. Eliminating default ads also avoids undesirable situations such as snow shoe advertisements displayed on a web site for real estate. However, the most common default ad is a public service announcement which is typically an unpaid advertisement. Not only does ad engine 112 allow for the querying of multiple ad networks 106, ad engine 112 can take in information for keeping track of default advertisements served.

With continued reference to FIG. 8, ad engine 112 provides intelligent ad selection. If the ad network 106 is using IFrame default tags as shown in section 810, then a cookie is set in the user agent 102 to remember the ad and all previously served ads in the ongoing ad chain. If the ad network 106 is using JavaScript default tags as shown in section 812, ad engine 112 remembers the ad as well as previous hop ads as JavaScript variables on the page 504.

At section 814, inquiry is then made to the ad network 106 for an ad from the ad inventory of the ad network 106. If there is enough inventory, an ad is then served to user agent 102 at section 816. If there are not enough ads in the ad inventory, different actions are taken according to the protocol (IFrame or JavaScript) of the ad network tag involved.

Accordingly, when a JavaScript ad network tag is involved, then the default JavaScript action is to make a new ad request with hop information from the JavaScript object or objects currently on the page 504 as shown at section 818. If an IFrame ad network tag is involved, the IFrame default sends to the ad engine 112 information encoded in a string or other message as shown at section 820. The message can be in a form as follows: dk.html?account&size&network as shown at section 822. The "dk.html" command may serve to retrieve the last ad information from the cookies stored on the webpage 504, and to make a new ad engine 112 request with the accompanying stored hop information.

For either the JavaScript or IFrame defaults, new ad requests are generated and transmitted to the ad engine 112 as shown at section 824. This completes the loop, and now a link in the chain has been made as a hop, which occurred when the default was served and a second request was made to the ad engine 112 by either the JavaScript route or the IFrame route.

This loop can then be repeated until a new ad is served or until the number of hops equals a determined number, for example five, as shown at section 826, or a period of time elapses. Once this threshold has been reached, a default, backup or house ad may be served to user agent 102 at section 828, thereby completing the operation of the ad engine 112, ad networks 106, host server 104, and user agent 102

The process set forth requires customization because the ad networks 106 have varied technology and varied ways of serving a default ad. Some ad networks 106 use JavaScript to serve a default ad, and ad engine 112 seeks to keep track of which ad networks 106 it has already hopped to for a given ad impression in JavaScript. Other ad networks 106 use IFrames (which are "pages within the page") to serve their defaults. For these ad networks 106, ad engine 112 uses cookies to keep track of which ad networks 106 it has already hopped to for a given ad impression. Often, ad engine 112 hops to both types of ad networks 106 during a given ad impression.

Still another key feature of the present application is that ad engine 112 prioritizes ad networks 106 from which it is going to request an ad first. If the present system receives a default advertisement and then "hops", ad engine 112 reprioritizes the remaining ad networks 106 yet to be tried and then selects the next ad network 106 based on its anticipated performance. This brings the benefit of yielding the highest revenue and at the same time reduces the chance of a default ad being found at the next ad network 106, thereby reducing the total time it takes to serve an ad to the viewer.

Another feature of the present application is that the system accounts for the complications that can arise from having to eliminate defaults on a page 504 where multiple ads are viewed by a single user 110. This tracking ability allows it to work with different ad networks 106, separately "hopping" as appropriate, for each separate advertisement space on the webpage 504, separately keeping track of the hops and defaults for the single user 110.

An additional feature of the present application is the concept of calculating the number of times that a default was avoided, and displaying this information to the publisher 502 in a manner that would clearly convey the benefit the advertiser has received.

Commonly defaults are managed within an ad network 106 using a daisy chain approach. FIG. 9A depicts exemplary processes for the daisy chain approach, which begins at block 902. At decision-block 904, daisy chain enabled ad network 106 determines whether a paid advertisement is available. A default advertisement is returned when no paying ad is available at block 906. Otherwise, daisy chain enabled ad network 106 serves a paid ad at block 908.

FIG. 9B illustrates a table representing information for a plurality of daisy chain enabled ad networks 106 as seen by ad engine 112. Each daisy chain enabled ad network 106 includes a floor price and when necessary, as provided for in block 906 above, a default, backup, or house default ad network tag. For example and as shown, daisy chain enabled ad network A 912 has a floor price of ninety cents and a default ad network tag V. The default ad network tag can correspond with a default, backup, or house ad.

In addition, daisy chain enabled ad network B 914 has a floor price of eighty-five cents and a default ad network tag W corresponding with a default, backup, or house ad. Daisy chain enabled ad network C 916 has a floor price of eighty-seven cents and a default ad network tag X corresponding with a default, backup, or house ad. Daisy chain enabled ad network D 918 has a floor price of sixty cents and a default ad network tag Y corresponding with a default, backup, or house ad. Daisy chain enabled ad network E 920 has a floor price of fifteen cents and a default ad network tag Z corresponding with a default, backup, or house ad.

Ad networks 106, as herein introduced, can be in the form of a default killer enabled ad network 106, which provides a more optimized approach. With reference to FIG. 9C, exemplary code for removing default, backup, or house ads is presented. When placed within pages 504 generated by webpage publishers 502, ad networks can reference a default killer enabled ad network 106, instead of a daisy chain enabled ad network 106. In essence, this removes ad network tags that generate default, backup, or house ads.

Figures 9D, 9E:
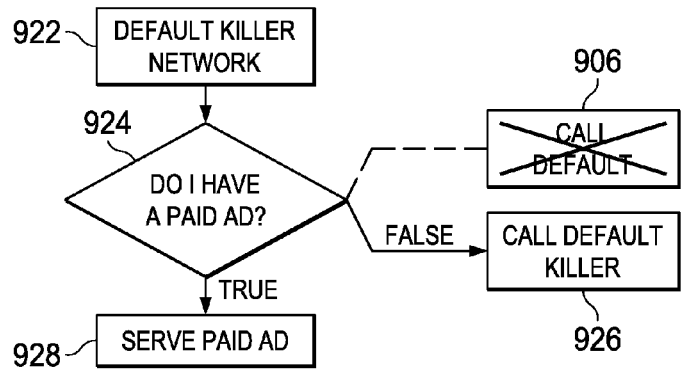

FIG. 9D depicts exemplary processes performed by a default killer approach by a default killer enabled ad network 106, the process beginning at block 922. At decision block 906, default killer enabled ad network 106 determines whether a paid advertisement is available. A default killer is returned when no paying ads are available at block 926, instead of calling block 906. Otherwise, default killer enabled ad network 106 serves a paid ad at block 928.

FIG. 9E illustrates a table representing information for a plurality of default killer enabled ad networks 106 as seen by ad engine 112. Each default killer enabled ad network 106 includes a floor price and when necessary, as provided for in block 926 above, a default killer (dk) ad network tag. For example and as shown, default killer enabled ad network A 912 has a floor price of ninety cents and a default killer (dk) ad network tag.

In addition, default killer enabled ad network B 912 has a floor price of eighty-five cents and a default killer (dk) ad network tag. Ad network C 916 has a floor price of eighty-seven cents and a default killer (dk) tag. Ad network D 918 has a floor price of sixty cents and a default killer (dk) tag. Ad network F 920 has a floor price of fifteen cents and a default killer (dk) tag. Each default killer ad network tag will lead the user agent 102 to another ad network that possibly serves a paying ad. Functions and features of the default killer enabled ad network 106 will become apparent in the following discussion.

Figure 10:
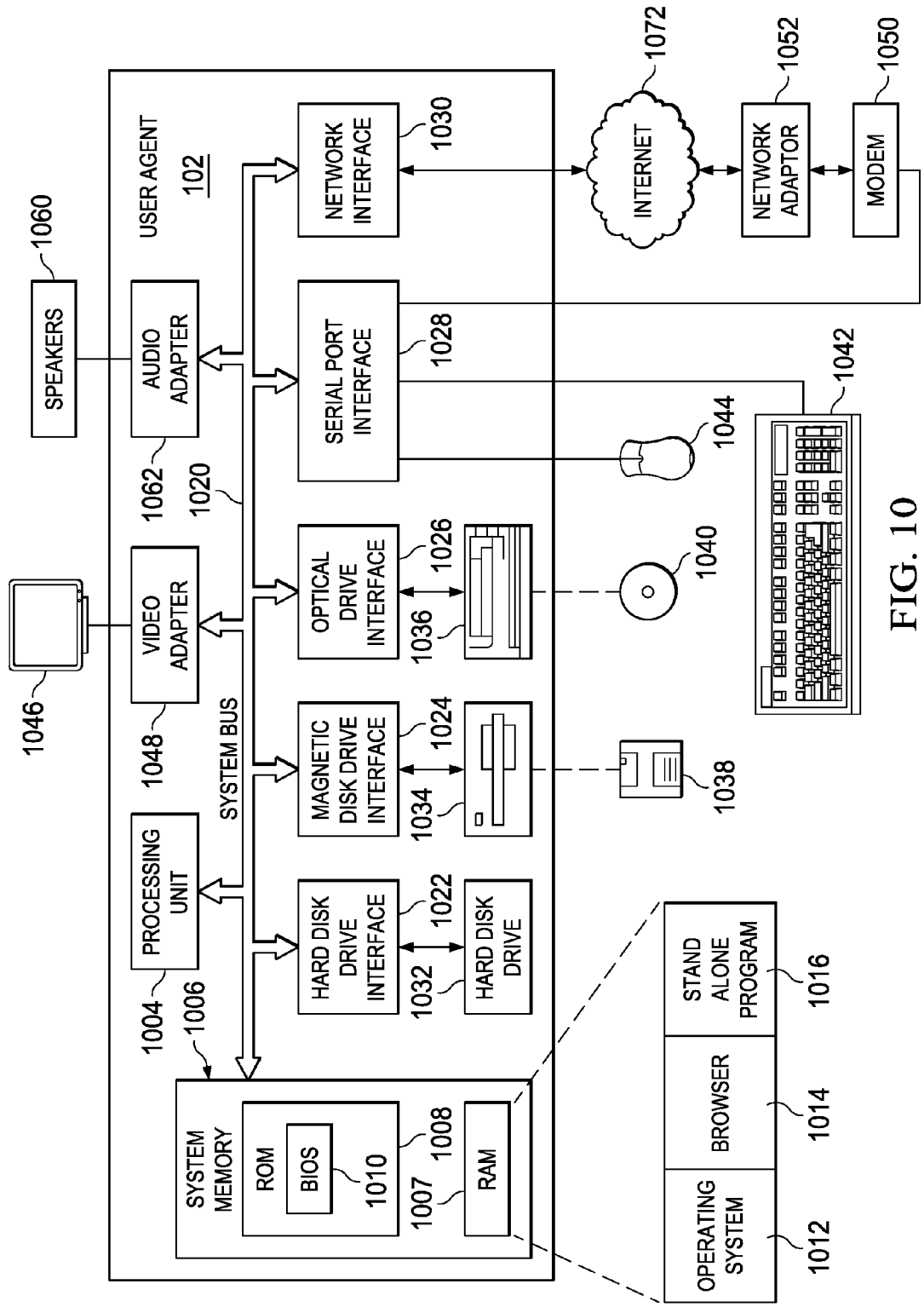
FIG. 10 is a diagram illustrating an exemplary hardware environment for the user agent in accordance with one aspect of the present application.

To illustrate the system and method of the present application, individual components will now be discussed. Beginning with user agent 102, an exemplary hardware and operating environment for implementing user agent 102 is shown in FIG. 10. The user agent 102 can include a processing unit 1004, a system memory 1006, and a system bus 1020 that operatively couples various system components, including the system memory 1006 to the processing unit 1004. User agent 102 memory 1006 may include read only memory (ROM) 1008 and random access memory (RAM) 1007. A basic input/output system (BIOS) 1010, containing the basic routines that help to transfer information between elements within the user agent 102, such as during start-up, is stored in ROM 1008. The user agent 102 may include a hard disk drive 1032 for reading from and writing to a hard disk, not shown, a magnetic disk drive 1034 for reading from or writing to a removable magnetic disk 1038, and an optical disk drive 1036 for reading from or writing to a removable optical disk 1040 such as a CD ROM or other optical media. The hard disk drive 1032, magnetic disk drive 1034, and optical disk drive 1036 are connected to the system bus 1020 by a hard disk drive interface 1022, a magnetic disk drive interface 1024, and an optical disk drive interface 1026, respectively. A number of program modules may be stored on the hard disk 1032, magnetic disk 1034, optical disk 1036, ROM 1008, or RAM 1007, including an operating system 1012, browser 1014, and a stand alone program 1016.

A user 110 may enter commands and information into the user agent 102 through input devices such as keyboard 1042 and pointing device 1044, for example, a mouse. These and other input devices are often connected to the processing unit 1004 through a serial port interface 1028 that is coupled to system bus 1020.

A monitor 1046 or other type of display device is also connected to user agent 102 to the bus 1020 via an interface, such as a video adapter 1048. In addition to the monitor 1046, user agent 102 can include other peripheral output devices, such as a printer or speakers 1060, which can be connected to processing unit 1004 through audio adapter 1062.

User agent 102 can be connected to the internet 1072. When used in a LAN environment, user agent 102 may be connected to the local network through a network interface or adapter 1030. When used in a WAN environment, user agent 102 typically includes a modem 1050, a network adapter 1052. The modem 1050 is connected to the system bus 1020 via the serial port interface 1028.

Figure 11A:
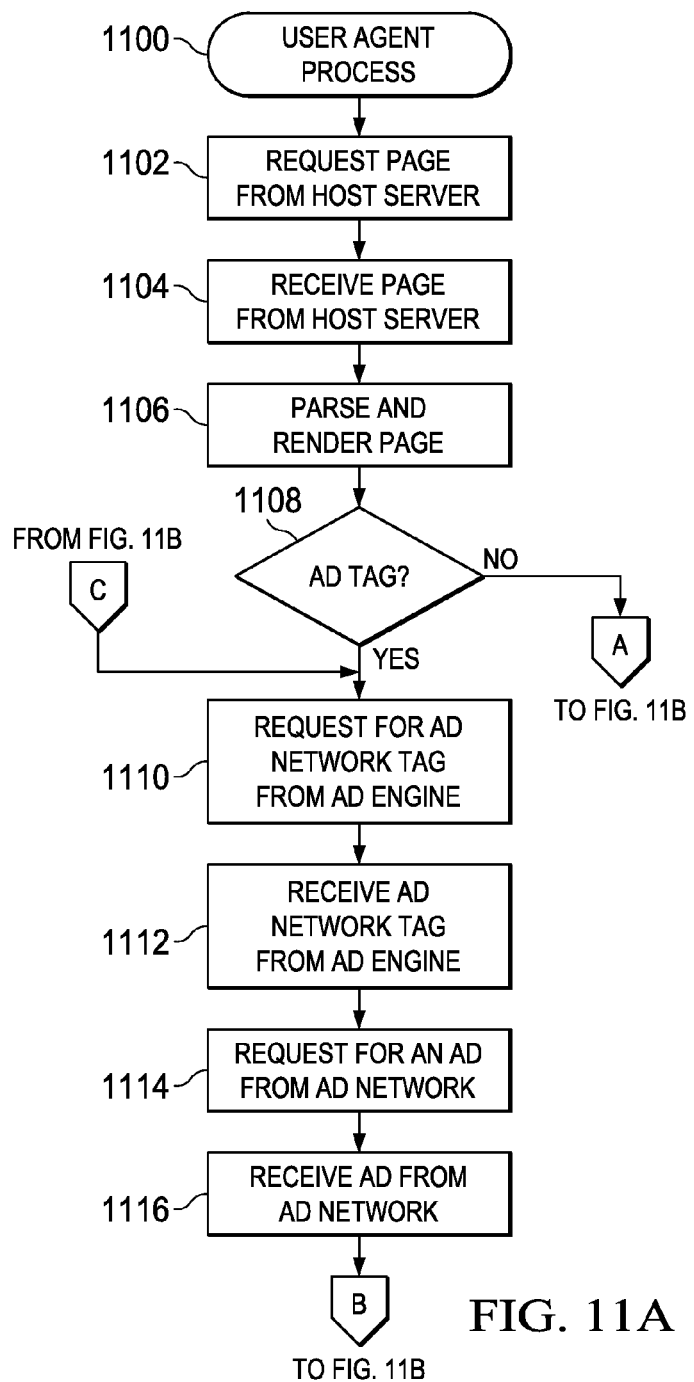
FIGS. 11A and 11B are exemplary flow charts showing illustrative routines performed by the user agent in accordance with one aspect of the present application.
Figure 11B:
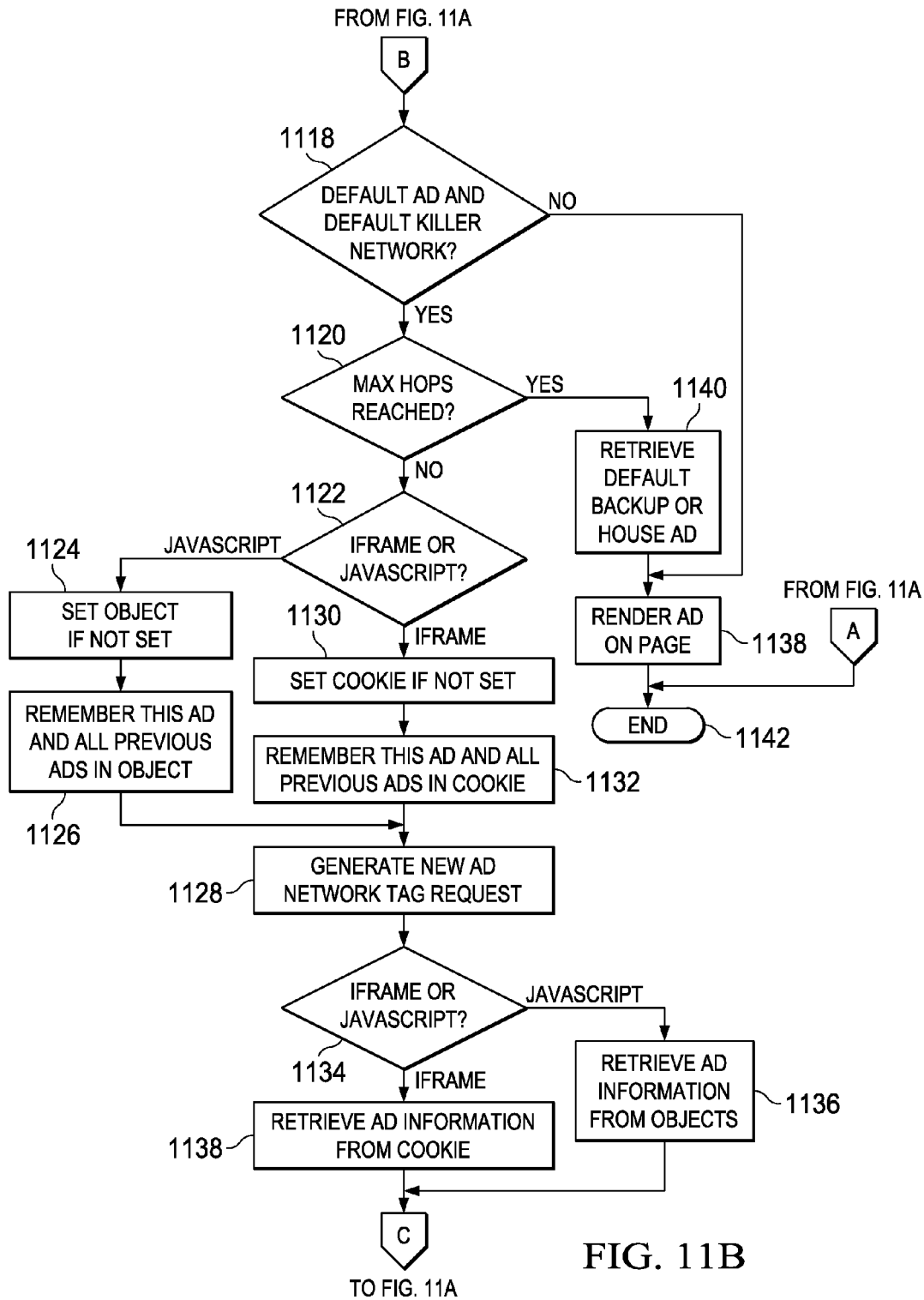

Operationally, user agent 102, preferably running browser 1014, performs the exemplary processes shown in FIGS. 11A and 11B. The user agent 102 process begins at block 1100. At block 1102, user agent 102 makes a request for a webpage 504 from host server 104. Typically, the request will be an HTTP request to an HTTP host server 104 over network 108. In other embodiments, user agent 102 may retrieve a local webpage 504. Alternatively, a standalone program 1016, such as an instant message application, can be used to make the request.

In response to the request, user agent 102 receives a webpage 504 from host server 104 at block 1104. Generally, the webpage 504 is returned over the same channel that the request was sent. After receiving the webpage 504, user agent 102 parses and renders the webpage 504 at block 1106.

At decision block 1108, user agent 102 determines whether an ad tag is within webpage 504. If present, the ad tag directs user agent 102 to retrieve ad network tags from the ad engine 112 instead of retrieving ads directly through an ad network 106. Typically, the ad tag is placed into the webpage 504 by the webpage publisher 502.

If there is no ad tag within webpage 504, the user agent 102 process ends at block 1142. Generally speaking, a webpage 504 with no ad tag signifies that the webpage publisher 502 has not signed with Rubicon. Nevertheless, those webpage publishers 502 who have placed the ad tag within their webpages 504 must still be verified by ad engine 112. This prevents malicious use of ad engine 112.

Continuing with decision block 1108, if an ad tag is within webpage 504, user agent 102 requests for an ad network tag from ad engine 112 at block 1110. The request can be communicated over network 108, and can include user information. Alternatively, ad engine 112 can make a separate request for user information from user agent 102. At block 1112, user agent 102 receives an ad network tag from ad engine 112. The ad network tag supplied by ad engine 112 can be selected from many ad networks 106.

At block 1114, user agent 102 makes a request for an ad from ad network 106 corresponding to the received ad network tag. At block 1116, user agent 102 receives an ad from ad network 106. The received ad can be a default or non-default ad. If a default ad is received, and dependent on the ad network 106, a default network ad tag or a default killer (dk) ad network tag will be provided as shown in FIGS. 9A, 9B, 9C, 9D, and 9E.

At decision block 1118, user agent 102 determines whether a default ad has been served by ad network 106. Furthermore, and also at decision block 1118, user agent 102 determines whether a default killer (dk) ad network tag has been provided. If either is no, then the ad is rendered on webpage 504 at block 1138 and the process ends at block 1142.

However, when a default ad has been received and a default killer (dk) ad network tag has been provided, user agent 102 determines whether the maximum number of hops have been reached at decision block 1120. In other words, user agent 102 checks if the maximum number of ad networks 106 has been queried.

If the maximum number of hops has been reached at decision block 1120, a default, backup, or preferably, house ad is retrieved at block 1140. At block 1138, the ad is displayed on webpage 504 and the process ends at block 1142.

Returning to decision block 1120, when the maximum number of hops have not been reached the process continues at decision block 1122, where user agent 102 determines whether an IFrame or JavaScript default tag has been received. At block 1130, user agent 102 sets cookies if no previous cookies were set when an IFrame default tag has been received. In one embodiment, an RUID lifetime cookie and an RSID session cookie can be set. The IFrame default ad is then remembered along with all previous ads in the cookies at block 1132.

Returning to decision block 1122, an object on user agent 102 is set if it was not already set when a JavaScript default ad is received at block 1124. The JavaScript default ad is then remembered along with all previous ads in the object at block 1126. From block 1132 and block 1126, user agent proceeds at block 1128 where a new ad network tag request is generated.

To generate the new ad network tag request, at decision block 1134, user agent 102 determines whether an IFrame or JavaScript ad network tag is being requested. If an IFrame ad network tag is requested, user agent 102 retrieves ad information from the cookies at block 1138. User agent 102 retrieves ad information from objects when a JavaScript ad network tag is requested at block 1136. User agent 102 then proceeds to block 1110 where another ad network tag is requested using the information retrieved from the cookies or objects.

Typically, the user agent 102 process is repeated for each ad impression 506 on webpage 504. Furthermore, each ad can be retrieved from different ad networks 106, the same ad network 106, or a combination thereof. In addition, while user agent 102, in this embodiment, has been understood to fill in ad impressions 506 on a webpage 504 shown on a browser 1014, the process may also be used to provide advertisements in standalone programs 1016 and other applications displaying advertisements.

Figure 12:
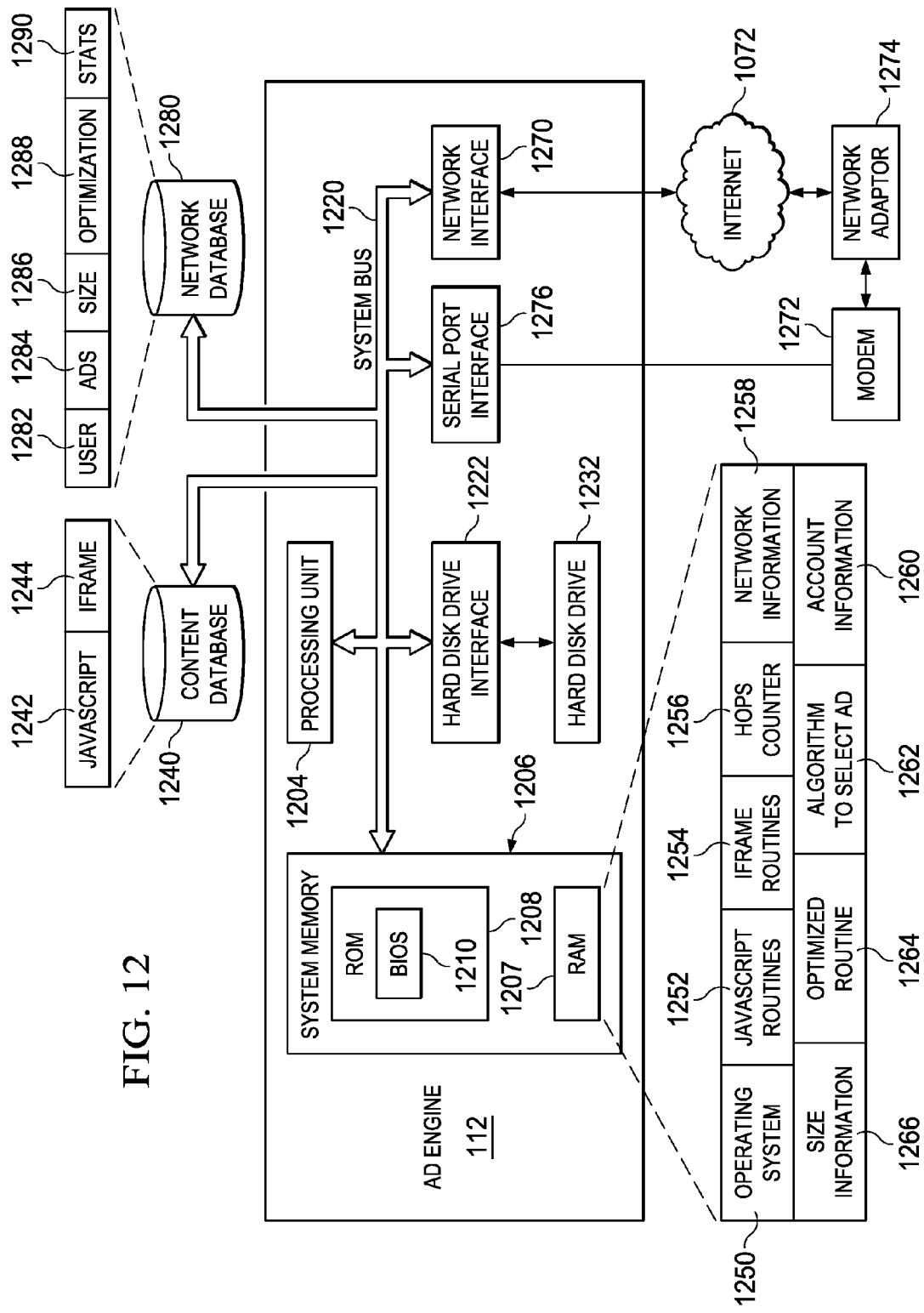
FIG. 12 is a diagram illustrating an exemplary hardware environment for the ad engine in accordance with one aspect of the present application.

With reference now to FIG. 12, a diagram illustrating an exemplary hardware environment for ad engine 112 is presented. Ad engine 112 can include a processing unit 1204, a system memory 1206, and a system bus 1220 that operatively couples various system components, including the system memory 1206 to the processing unit 1204. The system memory 1206 may include read only memory (ROM) 1208 and random access memory (RAM) 1207. A basic input/output system (BIOS) 1210, containing the basic routines that help to transfer information between elements within ad engine 112, such as during start-up, is stored in ROM 1208.

Ad engine 112 may include a hard disk drive 1232 for reading from and writing to a hard disk, not shown. The hard disk drive 1232 is connected to the system bus 1220 by a hard disk drive interface 1222. A number of program modules may be stored on the hard disk 1232, ROM 1208, or RAM 1207, including an operating system 1250, JavaScript routines 1252, IFrame routines 1254, hops counter 1256, network information 1258, account information 1260, algorithm to select ad 1262, optimized routine 1264, and size information 1266.

Ad engine 112 can be connected to the internet 1072. When used in a LAN environment, ad engine 112 may be connected to the local network through a network interface 1270. When used in a WAN environment, ad engine 112 typically includes a modem 1272 and a network adapter 1274. The modem 1272 is connected to the system bus 1220 via the serial port interface 1276.

Figure 13A:
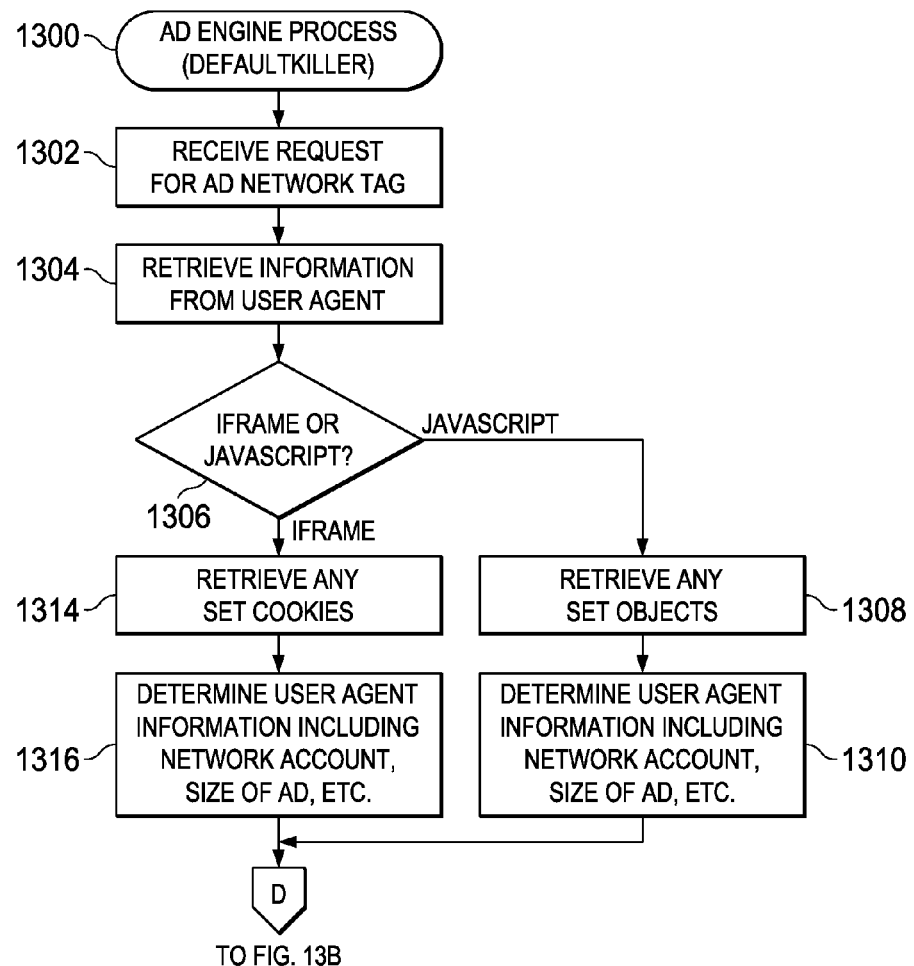
FIGS. 13A and 13B are exemplary flow charts showing illustrative routines performed by the ad engine in accordance with one aspect of the present application.

Connected to system bus 1220 is content database 1240 and network database 1280. Content database 1240 stores ad network tags. These ad network tags can be stored in separate tables listed as JavaScript 1242 and IFrame 1244. Network database 1280 also stores tables of information. These tables include user information 1282, ads 1284 such as house ads, size information 1286, optimization information 1288, and stats 1290. A single database can hold both the tables of content database 1240 and network database 1280. Uses of the tables stored in content database 1240 and network database 1280 will become apparent with respect to the following process described in FIG. 13, which represents a typical scenario in which ad engine 112 receives a request for an ad network tag and sends an ad network tag in response to the request.

The ad engine 112 process begins at block 1300. At block 1302, a request is received for an ad network tag. Multiple ways of retrieving ad network tags have been described above as shown in FIGS. 6A, 6B, 6C, 6D, and 6E. Continuing, ad engine 112 retrieves information from user agent 102 at block 1304. The user information can contain any previously seen ads. At decision block 1306, ad engine 112 determines whether user information has been stored through IFrame cookies or JavaScript objects. If the user agent 102 information has been stored as JavaScript objects, ad engine 112 retrieves any set objects that may have been set on user agent 102 at block 1308. Ad engine 112 then determines user agent 102 information from the set objects including network account, size of ads, etc. at block 1310.

Returning to decision block 1306, if user agent 102 information has been set as IFrame cookies, ad engine 112 retrieves any set cookies that have been set on user agent 102 at block 1314. Ad engine 112 then determines user agent 102 information from the set cookies including network account, size of ads, etc. at block 1316.

Figure 13B:
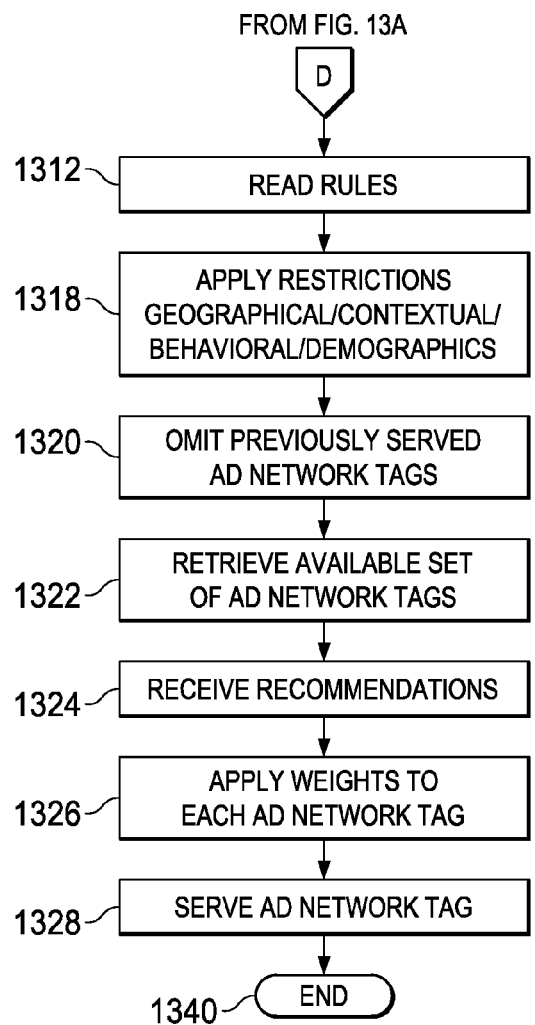

Continuing with FIG. 13B, processes from block 1310 and block 1316 proceed to block 1312 where ad engine 112 reads a set of rules. At block 1318, ad engine 112 applies restrictions to the ad network tags. These restrictions can include geographical, contextual, behavioral, and demographical restrictions.

At block 1320, ad engine 112 omits all previously served ad network tags. Previously served ad network tags can be determined either through cookies or objects set on user agent 102. At block 1322, ad engine 112 retrieves a set of available ad network tags. Recommendations are received for each ad network tag at block 1324. Weights are applied to each ad network tag at block 1324. After the weights are applied, ad engine 112 serves an ad network tag to user agent 102 at block 1326. The process ends at block 1328.

Through the process described above, ad engine 112 performs multivariate testing. This includes optimizing ad network tags by testing ads from different ad networks 106 to find the ad networks 106 with the best ads, the best ads often involving the best click rate or highest revenue generation. Ad engine 112 can decipher ad inventory based on demography, geography, content, and many other factors and then match each ad impression with the optimal money making opportunity.

Figure 14:
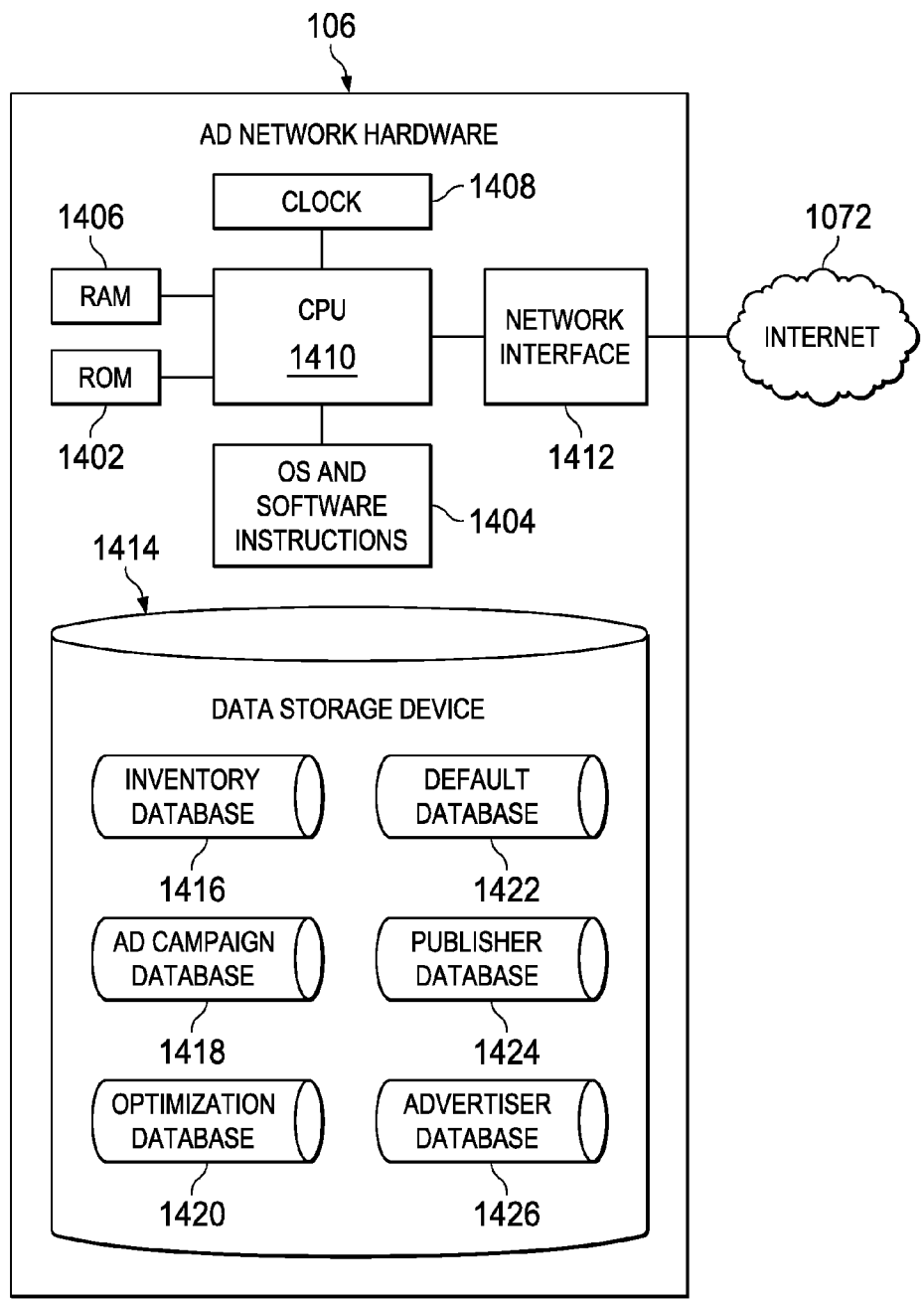
FIG. 14 is a diagram illustrating an exemplary hardware environment for the ad network in accordance with one aspect of the present application.

With reference now to FIG. 14, hardware for an exemplary ad network 106 is presented. The ad network 106 typically takes the form of a computer server, and more specifically a web server. The server can store advertisements used in online marketing and delivers them to website visitors. Ad network 106 can include ROM 1402, operating system and software instructions 1404, RAM 1406, clock 1408, central processor (CPU) 1410, network interface 1412 connected to internet 1072, and data storage device 1414.

A conventional personal computer or computer workstation with sufficient memory and processing capability can be used as ad network 106. Alternatively, multiple interconnected servers may also serve as ad network 106. Ad network 106 should be able to handle high volume of transaction and large amount of mathematical calculations for communication and data processing. RAM 1406 and ROM 1402 are used to support the program codes that are operated by the CPU 1410. The memory may be in a form of a hard disk, CD ROM, or equivalent storage medium. CPU 1410 supports the authentications such as communications from external data servers, as well as allowing for anonymous transactions and general data encryption.

In the preferred embodiment, data storage device 1414 can include hard disk magnetic or optical storage units, as well as CD ROM, CD RW or DVD Rom and flash memory such as Compact flash and secure digital cards. Data storage device 1414 contains databases used in the processing of transactions including inventory database 1416, ad campaign database 1418, optimization database 1420, default database 1422, publisher database 1424, and advertiser database 1426.

Inventory database 1416 tracks all information pertaining to inventory levels of each advertising partner. As provided above, inventory can be based on default ads or non-default ads. Database 1416 enhances the value of an ad campaign by warning ad network 106 of whether it is about to run out of paying advertisements.

Ad campaign database 1418 can be used to keep track of campaign information by ad network 106 for each advertiser the ad network 106 has partnered with. Optimization database 1420 is a functional unit that performs ad campaign optimizations for advertisers. Default database 1422 keeps track of default ad information. Publisher database 1424 keeps track of information related to the webpage publishers 502 that ad network 106 may deal with. Publisher database 1424 tracks information pertaining to the publisher such as publisher's identification, publisher's name, advertising location, physical address, phone, contact email, group list, number of advertisement spaces, types of advertisements supported, etc. Advertiser database 1426 tracks all information pertaining to the advertisers such as an advertiser identification, advertiser's name, advertiser contact information, advertiser category, number of advertisement campaign, account credit information, etc.

Continuing with FIG. 14, ad network 106 includes a network interface 1412 in order to communicate with other components. Conventional internal or external modems may serve as network interface 1412. A cable modem may be used as a network interface 1412. Network interface 1412 supports modem at a range of baud rate from 2400 upward. In the preferred embodiment, network interface 1412 is connected to the internet 1072. This allows publishers 502 and advertisers access from a wide range of on-line connections. Several commercial electronic mail servers include the above functionality.

While the above embodiment describes a single computer system acting as ad network 106, the functionality can be distributed over multiple computing systems. In one embodiment, ad network 106 is configured in a distributed architecture, wherein the databases and processors are housed in separate units or locations. Some servers perform the primary processing functions and contain at a minimum RAM, ROM, and a general processor. Each of these servers is attached to a WAN hub which serves as the primary communication link with the other servers and interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system.

Figure 15:
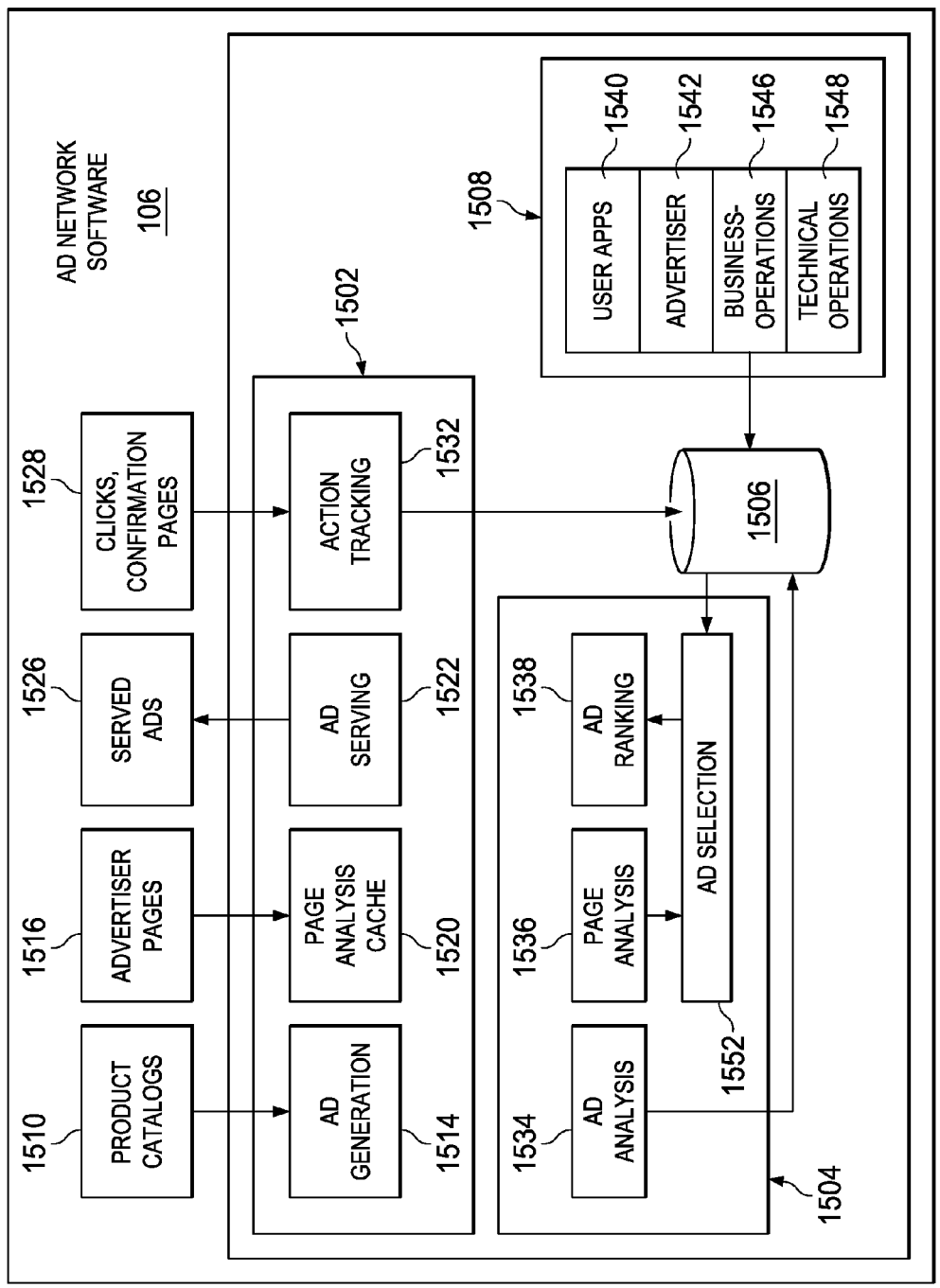
FIG. 15 is a diagram illustrating an exemplary software environment for the ad network in accordance with one aspect of the present application.

FIG. 15 illustrates an exemplary software environment for ad network 106, including programming modules included therewith. Ad network 106 typically includes system infrastructural components 1502, a relevance module 1504, system storage 1506, and associated system applications 1508. The system infrastructural components 1502 include an ad generation module 1514, a page analysis cache 1520, an ad serving module 1522, and an advertising tracking module 1532. The relevance module 1504 includes an ad analysis module 1534, a page analysis module 1536, an ad selection module 1552, and an ad ranking module 1538. System applications 1508 typically include user applications 1540, advertiser-publisher applications 1542, business-operations applications 1546, and technical operations 1548.

In ad network 106, advertiser pages and/or sites 1516 that are submitted from advertisers, sent to ad network 106, are received through page analysis cache 1520. Some ad networks 106 provide ad generation 1514 based on all or part of a catalog 1510 that is submitted or otherwise authorized by an advertiser. The ad network 106 can also receive previously prepared ads from an advertiser. The ad analysis module 1534 analyzes received or generated ads, and stores the analyzed ads for further use. Based on available ad space and the associated analyzed advertiser page, one or more of the ads with the highest rankings are provided by the ad serving module, whereby the served ads 1526 are presented in conjunction with the analyzed publisher page 504 to a user 110. User actions 1528, including but not limited to clicks, sales, sign-ups, and/or confirmations are received by an action tracking module 1532, which also preferably provides feedback for ad network 106.

A common method for selling ads on a website 504 is for a publisher 502 on host server 104 to establish a relationship with an ad network 106. Through these ad networks 106, relationships are built directly with advertisers who make ad purchases. For most ad networks 106, advertisements are served from their ad servers, which respond to a website 504 once a request is made. Ad networks 106 then seek to match the advertisers they have relationships with to publishers they have relationships with, selling as much of this space as they can.

Generally, ad networks 106 pay the publishers 502 for allowing their advertisements to be shown. Large publishers often sell only their remnant inventory through ad networks 106. Typically, ten to sixty percent of the remnant inventory is sold through advertising networks 106. Smaller publishers often sell their entire inventory through ad networks 106. One type of ad network 106, known as a blind network, allows advertisers to place ads, but does not know the exact locations of where their ads are being placed.

Payment to publishers 502 can be provided by ad networks 106 in a variety of ways. Pay-per-click (PPC) indicates payment based on click-throughs, while cost-per-click (CPC) indicates measurement of cost on a per-click basis for contracts not based on click-throughs. Cost-per-mil (CPM) means cost per thousand ads. A CPM of one dollar would mean a cost of one dollar for one thousand ads.

Effective CPM is the average rate that a publisher 502 gets for one thousand ads. Usually banner ads factor in the fact that much of the publisher's inventory may be unsold. If one sells half of one's banner inventory at one dollar CPM and cannot sell the other half, then one's effective CPM would be point five CPM. Effective CPM is a term usually used to describe how good or how poor a given ad network's 106 rates are for a given publisher 502, which factors in the unsold ads the ad network 106 could not sell.

Cost-per-click (CPC) refers to advertising that is sold on the basis that money is only given for each time an ad is directly responded to via a click through to an advertiser's site. CPC ads are usually designed to not be very appealing so they will only be clicked on by those most interested in what the ad is trying to sell.

Cost-per-action (CPA) refers to ads that are sold on the basis that money is only given when a certain action occurs because of the ad. A CPA ad could be one in which a publisher 502 gets paid for people who click through an ad and sign up for a newsletter, enter a contest, or fill out a form requesting more information on a product. Many consider direct sales or cost-per-sale ads, and CPC ads to also be a form of CPA, but CPA usually refers to being paid for leads, sign ups, and so on.

Cost-per-sale (CPS) refers to a program in which one is paid according to products or services sold. This could be a percentage or a set amount. Targeting and preselling a person on a product are large parts of what it takes to successfully refer sales to other merchants. As such, CPS is not really considered a form of advertising, but as a sales-based commission program.

A hybrid campaign is online advertising campaign in which an advertiser agrees to pay for the ad partly via CPM and partly via CPC. So, for example, a hybrid campaign could pay both twenty cents CPM and ten cents per click. Hybrid campaigns ensure some minimum payout level to publishers via the CPM part, but place some risk on the publisher as the quantity of clicks the ad gets will contribute to the amount the publisher earns.

In addition, ad network 106 performs various other tasks like counting the number of impressions/clicks for an ad campaign and report generation, which helps in determining the return of investment (ROI) for an advertiser on a particular website.

Common functions provided by ad networks 106 include uploading advertisements and rich media, trafficking ads according to differing business rules, targeting ads to different users, or content, tuning and optimization based on results, and reporting impressions, clicks, post-click & post-impression activities, and interaction metrics. In addition, ad networks 106 can frequency cap so users only see messages a limited amount of time, sequence ads so users see messages in a specific order (sometimes known as surround sessions), exclude competition so users do not see competitors' ads directly next to one another, display ads so an advertiser can own 100% of the inventory on a page 504 (sometimes known as roadblocks), and target ads to users based on their previous behavior (behavioral marketing or behavioral targeting).

Figure 16:
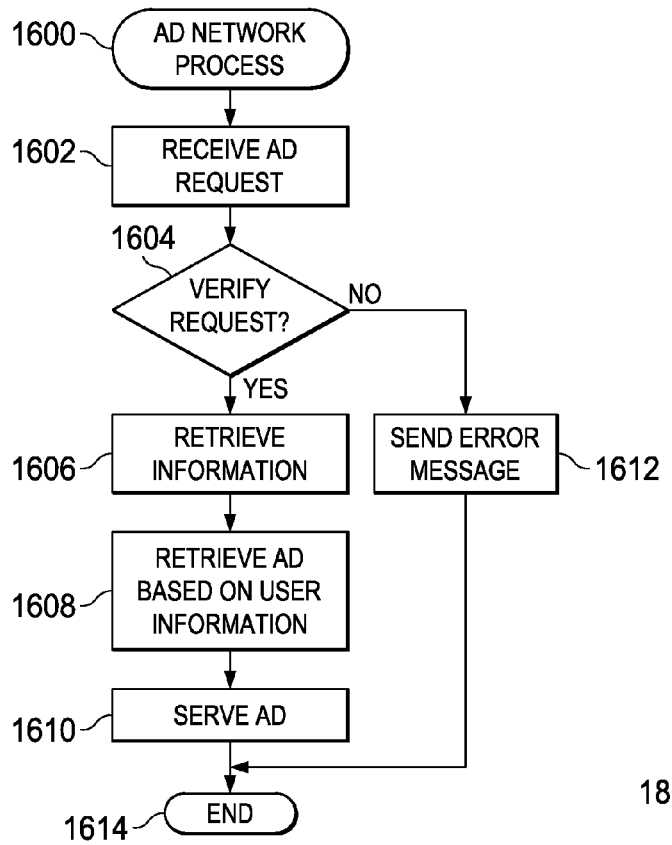
FIG. 16 is an exemplary flow chart showing illustrative routines performed by the ad network in accordance with one aspect of the present application.

With reference now to FIG. 16, an exemplary ad network 106 process begins at block 1600. At block 1602, ad network 106 receives an ad request. As shown in the previous embodiments, the request can be received from user agent 102 or ad engine 112. In response to the request, ad network 106 verifies the request at decision block 1604. Verifying the request involves ad network 106 determining whether an ad can be given to the requesting party. When the request cannot be verified, ad network 106 sends an error message at block 1612 and the process ends at block 1614.

Otherwise, ad network 106 retrieves information from the requesting party at block 1606 if the requesting party has been verified. The information can include what type of ad the requesting party is looking for. In other embodiments, the requesting party sends the information with the request. At block 1608, an ad is retrieved based on the user information. At block 1610 the ad is served to the requesting party and the process ends at block 1614.

Figure 17:
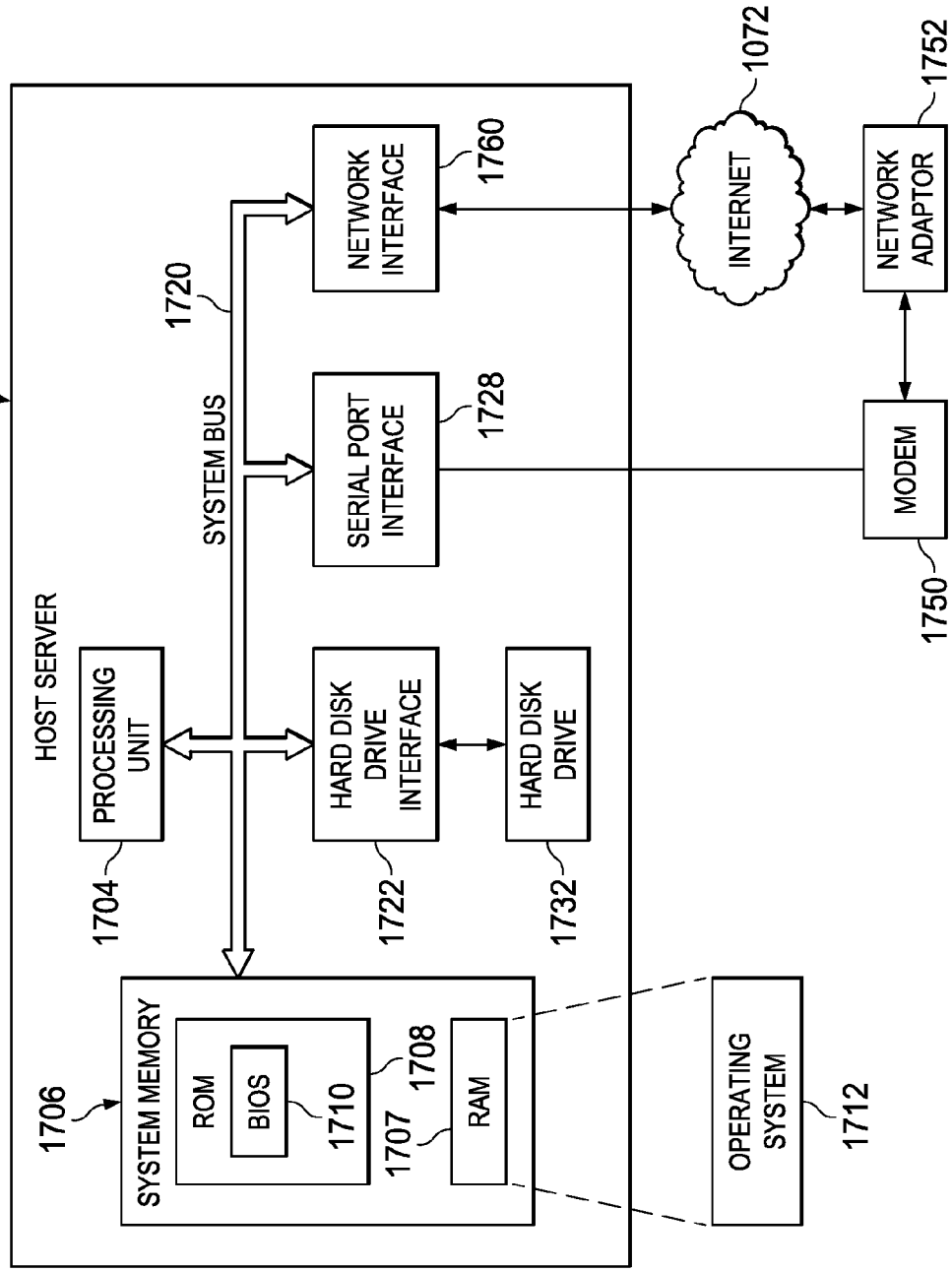
FIG. 17 is a diagram illustrating an exemplary hardware environment for the host server in accordance with one aspect of the present application.

FIG. 17 is a diagram illustrating an exemplary hardware environment for host server 104. Host server 104 can include a processing unit 1704, a system memory 1706, and a system bus 1720 that operatively couples various system components, including the system memory 1706 to the processing unit 1704. The system memory 1706 may include read only memory (ROM) 1708 and random access memory (RAM) 1707. A basic input/output system (BIOS) 1710, containing the basic routines that help to transfer information between elements within the host server 104, such as during start-up, is stored in ROM 1708. Host server 104 can include a hard disk drive 1732 for reading from and writing to a hard disk, not shown. Hard disk drive 1732 is connected to system bus 1720 by a hard disk drive interface 1722. A number of program modules may be stored on the hard disk 1732, ROM 1708, or RAM 1707, including operating system 1712.

Host server 104 can be connected to the internet 1072. When used in a LAN environment, host server 104 can be connected to the local network through a network interface

1760. When used in a WAN environment, host server 104 typically includes a modem 1750 and a network adapter 1752. The modem 1750 is connected to the system bus 1720 via the serial port interface 1728.

Figure 18:
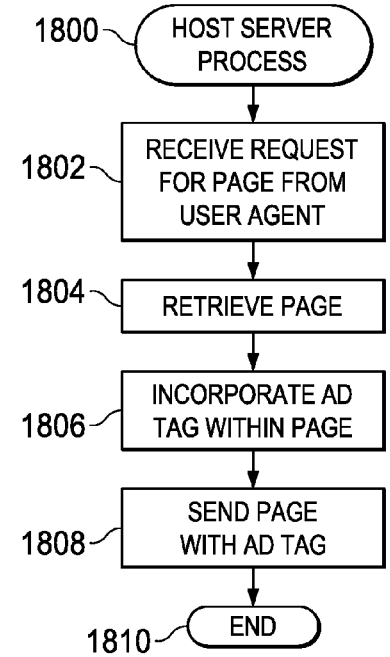
FIG. 18 is an exemplary flow chart showing illustrative routines performed by the host server in accordance with one aspect of the present application.

With reference now to FIG. 18, an exemplary ad network 104 process begins at block 1800. At block 1802, host server 104 receives a request for a webpage 504. In response to the request, host server 104 retrieves a webpage 504 at block 1804. Webpage 504, as discussed above, can be part of a larger website for a corporation. At block 1806, host server 104 incorporates an ad tag within the page 504 and sends the page 504 with the ad tag at block 1808. Host server 104 process ends at block 1810.

In accordance with one embodiment of the present application, a system is presented. The system includes a user agent 102 for rendering a page 504, wherein the page 504 includes an ad tag and at least one ad impression 506. The ad tag within the page 504 causes the user agent 102 to request ad network information. The system also includes an ad engine 112 capable of receiving requests for ad network information. In response to the requests for ad network information, the ad engine 112 provides ad network tags to the user agent 102, the user agent 102 receiving the ad network tags and sending ad requests based on the ad network tags.

Furthermore, the system includes a plurality of ad networks 106 each corresponding to the ad network tags and capable of receiving ad requests from the user agent 102. Each ad network 106 within the plurality of ad networks 106 serves default or non-default ads in response to the ad requests from the user agent 102 until a qualified ad is obtained by the user agent 102 for the at least one ad impression within the page 504. The qualified ad is either a non-default ad served from ad networks 106 within the plurality of ad networks 106, a default ad after a maximum number of ads from the plurality of ad networks 106 have been served, or a default ad after a period of time elapses.

In one aspect of the embodiment, the system further includes a host server 104 for providing the page 504 to the user agent 102. In another aspect, the host server 104, user agent 102, ad engine 112, and plurality of ad networks 106 communicate through a network 108. In yet another aspect, the page 504 includes two or more impressions 506 with each impression 506 served by different ad networks 106 within the plurality of ad networks 106. In another aspect, the page 504 includes two or more impressions 506 with each impression 506 served by different or similar ad networks 106 within the plurality of ad networks 106. In another aspect, the ad tag within the page 504 causes the user agent 102 to request ad network information that includes publisher's account information so the ad engine 112 can determine which ad network tags can be sent to the user agent 102.

In another aspect, the ad network tags can be sent to the user agent 102 based on subject matter of the page 504. In yet another aspect, the ad tag within the page 504 causes the user agent 102 to request ad network information that includes the publisher's account information so the ad engine 112 can track statistical data for the publisher. In another aspect, the ad engine 112 provides ad network tags based on known inventory levels of the plurality of ad networks 106. In still yet another aspect, the maximum number of ads from the plurality of ad networks 106 that have been served is five.

In accordance with another embodiment of the present application, a system is presented. The system includes a web server 104 hosting a website, wherein the website includes a plurality of pages 504, at least one page 504 incorporating an ad tag and at least one ad impression 506. The system also includes a user agent 102 running a browser for rendering the at least one page 504 from the web server 104, wherein the browser sets cookies or objects for storing previously seen ads and processes the ad tag within the at least one page 504 causing requests for ad network tags. Any previously seen ad information stored as cookies or objects is sent along with the requests for ad network tags.

Furthermore, the system includes an ad engine 112 capable of receiving requests for ad network tags and any previously seen ad information stored as cookies or objects. In response to the requests for ad network information, the ad engine 112 provides ad network tags to the user agent 102 using the previously seen ad information stored as cookies or objects. The user agent 102 receives the ad network tags and sends ad queries based on the ad network tags.

In addition, the system includes a plurality of ad networks 106 each corresponding to the ad network tags and capable of receiving ad queries from the user agent 102. Each ad network 106 within the plurality of ad networks 106 serves default or non-default ads in response to the ad requests from the user agent 102 until a qualified ad is obtained by the user agent 102 for the at least one ad impression 506 within the at least one page 504 from the plurality of ad networks 106.

In one aspect of the embodiment only default ads are stored as cookies or objects. In another aspect, cookies are stored on the user agent 102 when an IFrame default tag has been served by an ad network 106 within the plurality of ad networks 106 to keep track of the previously seen ads. In yet another aspect, objects are stored on the user agent 102 when a JavaScript default tag has been served by an ad network 106 within the plurality of ad networks 106 to keep track of the previously seen ads.

In accordance with yet another aspect of the present application, a system for maximizing advertisement revenue is presented. The system includes a plurality of ad networks 106 capable of receiving ad requests, wherein each ad network 106 within the plurality of ad networks 106 serves default or non-default ads in response to the ad requests. The system also includes a user agent 102 for rendering a page 504. The page 504 includes an ad tag and ad impressions 506, and the ad tag within the page 504 causes the user agent 102 to request ad network tags. Each ad network tag references an ad network 106 within the plurality of ad networks 106.

Furthermore, the system includes an ad engine 112 capable of receiving requests for ad network tags. In response to the requests for the ad network tags, the ad engine 112 provides ad network tags to the user agent 102. The user agent 102 receives the ad network tags and sends ad requests based on the ad network tags to the plurality of ad networks 106 until a qualified ad is obtained from the plurality of ad networks 106 by the user agent 102. The qualified ad is either a non-default ad served from an ad network 106 within the plurality of ad networks 106, or it is a default ad after a maximum number of ads within the plurality of ad networks 106 have been requested.

In one aspect of the embodiment, the ad engine 112 prioritizes the ad network tags. In another aspect the ad engine 112 re-prioritizes the ad network tags based on default ads received by the user agent 102.

In accordance with another embodiment of the present application, an ad engine 112 for providing intelligent ad selections is presented. The ad engine 112 includes a server connected to a network 108. The server includes at least one processor, a database for storing ad network tags corresponding to a plurality of ad networks 106, and memory operatively coupled to the processor, the memory storing program instructions when executed by the processor causes the processor to execute a plurality of routines. The routines include receiving a request for ad network information from a user agent 102 via the network 108, determining information about the user agent 102 including any previously seen ad networks 106 by the user agent 102, based on the determined information about the user agent 102, selecting an ad network 106 and retrieve the ad tag associated with the ad network 106 in the database, and sending the ad tag associated with the selected ad network 106 in response to the received request for ad network 106 information to the user agent 102 via the network 108.

In one aspect, the database further includes account information for a plurality of publishers 502. In another aspect, account information for each publisher 502 includes statistical data. In yet another aspect, the memory storing program instructions, when executed by the processor, further causes the processor to send the account information to a publisher 502 within the plurality of publishers 502. In another aspect, the memory storing program instructions, when executed by the processor, further causes the processor to verify an ad tag from a publisher 502. In another aspect, wherein determining information about the user agent 102 includes retrieving any set cookies or objects.

In yet another aspect, cookies are set by the user agent 102 when an IFrame default tag has been received by the user agent 102. In another aspect, objects are set by the user agent 102 when a JavaScript default tag has been received by the user agent 102. In still yet another aspect, the memory storing program instructions, when executed by the processor, further causes the processor to store the information about the user agent 102 including any previously seen ad networks 106 in the database so that a plurality of user agents 102 will be aware of those previously seen ad networks 106 serving default ads. In another aspect, the memory storing program instructions, when executed by the processor, further causes the processor to prioritize the ad network tags corresponding to the plurality of ad networks 106. In another aspect, wherein selecting an ad network includes excluding all previously seen ad networks 106 by the user agent 102. In another aspect, the memory storing program instructions when executed by the processor, further causes the processor to determine how the plurality of ad networks 106 are serving their ads from the previously seen ad networks 106 by the user agent 102.

In accordance with another embodiment of the present application, a computer-implemented method for managing a plurality of ad networks 106 so that optimal ads from the ad networks 106 are provided to user agents 102 is presented. The method includes receiving requests for ad network tags from a user agent 102 and responding to the requests by serving ad network tags until an optimal ad is obtained by the user agent 102, wherein the ad network tags identify ad networks 106. For each request received for an ad network tag from the user agent 102, the method determines information about the user agent 102, including any previously seen ad networks 106 that served default ads by retrieving cookies or objects on the user agent 102, selects an ad network 106 that is not one of the previously seen ad networks 106 that served default ads, retrieves an ad network tag associated with the selected ad network 106, and sends the ad network tag associated with the selected ad network 106 in response to the received request for ad network information to the user agent 102.

In another aspect, the optimized ad is a non-default ad or a default ad after a maximum number of requests for ad network tags has been, made by the user agent 102. In another aspect, wherein selecting an ad network 106 includes choosing an ad network 106 from a group of prioritized ad networks 106.

In accordance with yet another embodiment of the present application, a computer program product for maximizing advertisement revenues running on an ad engine 112 having a processor is presented. The computer program product is contained within computer-readable memory and includes code that directs the processor to communicate with a user agent 102 including receiving requests for ad network tags and sending ad network tags to the user agent 102 until a qualified ad is provided to the user agent 102. The computer program products also includes code that directs the processor to determine information about the user agent 102 including any previously seen ad networks 106 by the user agent 102, wherein the information allows the ad engine 112 to select an ad network 106 along with a corresponding ad network tag to be sent to the user agent 102.

In accordance with another embodiment of the present application, a computer readable medium storing instructions for causing at least one processor to perform a method for traversing through a plurality of ad networks 106 to retrieve optimized ads is presented. The method includes receiving a request for ad network information from a user agent 102. The method also includes determining information about the user agent 102 including any previously seen ad networks by the user agent 102. Furthermore, the method includes selecting an ad network 106 based on the determined information about the user agent 102 and retrieving the ad tag associated with the ad network 106. In addition, the method includes sending the ad tag associated with the selected ad network 106 in response to the received request for ad network information to the user agent 102.

In one aspect of the embodiment, wherein selecting the ad network 106 and retrieving the ad network tag associated with the ad network includes selecting the ad network 106 based on the highest revenue. In another aspect, wherein selecting the ad network 106 and retrieving the ad network tag associated with the ad network 106 includes selecting the ad network 106 based on reducing default ads.

In accordance with another embodiment of the present application, an ad engine 112 is presented. The ad engine 112 includes a server connected to a network 108. The server includes at least one processor, a database for storing ad network tags referencing ad networks 106, a memory operatively coupled to the processor, the memory storing program instructions which, when executed by the processor, causes the processor to execute routines. The routines include receiving a request for ad network 106 information from a user agent 102 via the network 108, selecting an ad network 106, requesting for an ad from the selected ad network 106, determining whether the ad uses a default tag, and repeat selecting ad networks 106 and requesting ads from the selected networks 106 if the ad uses default tags, otherwise, sending the ad from the selected ad network to the user agent 102 via the network 108.

In accordance with another aspect of the present application, a computer readable medium storing instructions for causing at least one processor to perform a method that provides higher-paying advertisements for maximizing revenue. The method includes sending a page 504 request to a host server 104. The method also includes receiving a page 504 based on the page 504 request from the host server 104, the page 504 having an ad tag embedded therein. Furthermore, the method includes parsing the received page 504 from the host server 104, wherein the ad tag, when processed, causes repeated requests for ad network tags corresponding to a plurality of ad networks 106 from an ad engine 112 until a qualified ad is received.

In one aspect of the present embodiment, wherein repeated requests for requesting for ad network tags from the ad engine 112 until the qualified ad is received includes sending a request for ad network 106 information to the ad engine 112, receiving an ad network tag corresponding to an ad network 106 from the ad engine 112, using the ad network tag received from the ad engine 112 to request for an ad from the ad network 106 corresponding to the ad network tag, receiving an ad from the ad network 106 corresponding to the ad network tag, displaying the ad if it is qualified, the ad being qualified if the ad is a non-default ad or after a maximum number of ads have been requested from ad networks 106, and repeating if the ad is not qualified.

In one aspect of the present embodiment, the computer readable medium of further includes storing the ad in a cookie if the ad uses an IFrame default tag. In another aspect, the computer readable medium further includes storing the ad in an object if the ad uses a JavaScript default tag. In yet another aspect, wherein the ad is also qualified if the ad is at least one of an appropriate size, comes from an appropriate network geography, targets the appropriate demographics, and contains the appropriate contextual information of the page 504.

In accordance with yet another embodiment of the present application, a computer-implemented method for reducing default ads is presented. The method includes requesting for ad network tags from an ad engine 112 until a qualified ad is received. For each ad network tag requested from the ad engine 112, querying for an ad from an ad network 106 associated with the ad network tag, receiving the ad from the ad network 106 based on the query, if the ad uses an IFrame default tag, storing the ad within a cookie, if the ad uses a JavaScript default tag, storing the ad within an object, and when the ad uses IFrame or JavaScript default tags and the maximum number of ad networks 106 have not been queried, requesting for another ad network tag from the ad engine 112 passing any cookies or objects to the ad engine 112.

In one aspect of the present embodiment, the ad engine 112 keeps track of which ad networks 106 have been queried through cookies or objects. In another aspect, the ad engine 112 eliminates requests to ad networks 106 known to serve ads using default tags. In yet another aspect, the maximum number of ad networks 106 is five. In another aspect, wherein storing the ad within a cookie or object accounts for varying technical capabilities and policies of many different ad networks 106. In still yet another aspect, the method includes displaying the number of ad networks 106 having been queried. In another aspect, the method includes displaying the benefits received. In another aspect, wherein a default ad is a low paying ad.

In accordance with yet another embodiment of the present application, in a user computer system having a display screen and a graphical user interface (GUI) supporting a browser, a method for optimizing advertisements from a plurality of ad networks 106 to fill ad impressions on a webpage 504 generated by a host server 104 and displayed by the browser supported on the GUI. The method includes sending a request to the host server 104, wherein the host server 104 serves a webpage 504 in response to the request, the webpage 504 incorporating standard markup language and an ad tag. The method also includes processing the ad tag within the webpage 504 causing requests for ad network 106 information from an ad engine 112, the ad engine 112, in response, providing ad network tags. Furthermore the method includes receiving the ad network tags from the ad engine 112, the ad network tags, when processed, cause a request for ads from ad networks 106 referenced by the ad networks tags until a qualified ad is received for each ad impression. In addition, the method includes displaying the standard markup language within the webpage 504 from the host server 104 and the qualified ad for each ad impression through the browser supported on the GUI.

In one aspect of the present embodiment, requesting for ad network 106 information from the ad engine 112 further includes transmitting data regarding any previously seen ads to the ad engine 112. In another aspect, the data regarding any previously seen ads is stored in a cookie or object. In yet another aspect, wherein the cookie stores data regarding ads using IFrame default tags. In another aspect, the object stores data regarding ads using JavaScript default tags.

In another aspect of the present embodiment, wherein causing a request for ads from ad networks 106 referenced by the ad network tags until the qualified ad is received for each ad impression includes querying one ad network 106 at a time. In another aspect, wherein querying one ad network 106 at a time includes querying another ad network 106 if the one ad network 106 times out.

In accordance with another embodiment of the present application, a host server 104 is presented. The host server 104 includes at least one processor and a database for storing at least one webpage 504, the at least one webpage 504 having an ad tag and at least one ad impression 506. The host server 104 also includes memory operatively coupled to the processor, the memory storing program instructions that when executed by the processor, causes the processor to receive a request for a webpage 504 from a user agent 102, retrieve the webpage 504 from the database, and send the webpage 504 to the user agent 102. The user agent 102 processes the webpage 504 including the ad tag, the processing of the ad tag within the webpage 504 causing the user agent 102 to request ad network information from an ad engine 112 that optimizes a plurality of ad networks 106.

In one aspect of the present embodiment, wherein the memory storing program instructions, when executed by the processor, further causes the processor to receive statistical information from the ad engine 112. In another aspect, wherein the memory storing program instructions, when executed by the processor, further causes the processor to receive data on inventory levels of the plurality of ad networks 106.

In accordance with a further aspect of the present embodiment, an ad network 106 is presented. The ad network 106 includes a server connected to a network 108. The server includes at least one processor and a database for storing default and non-default ads. The server also includes memory operatively coupled to the processor, the memory storing program instructions that when executed by the processor, causes the processor to receive a request for an ad from a user agent 102 via the network 108, determine from within the database the ad to be given to the user agent 102 based on the received request, and send the determined ad to the user agent 102, wherein the user agent 102 will determine if it is a qualified ad, and if not, the user agent 102 will request another ad network 106 to provide the ad.

In one aspect of the present embodiment, wherein the memory storing program instructions that when executed by the processor, further causes the processor to verify the user agent 102 before sending the ad. In another aspect, wherein the request for the ad includes information corresponding to ad criteria. In yet another aspect, wherein the user agent 102 is at least one of a web browser, instant message application, and standalone program. In another aspect, wherein the ad is at least one of a floating, expanding, polite, wallpaper, trick banner, pop-up, pop-under, video, map, and mobile ad.

In accordance with another aspect of the present application, an ad engine 112 is presented. The ad engine 112 includes a server connected to a network having at least one processor, a database for storing ad network tags, and a memory operatively coupled to the processor, the memory storing program instructions. When the program instructions are executed by the processor, the processor receives a request from a user agent 102 for an ad network tag through the network 108, retrieves the ad network tags from the database, applies restrictions to the ad network tags, selects an ad network tag by weighing the restricted ad network tags, and returns the selected ad network tag to the user agent 102 in response to the request for the ad network tag through the network 108.

In one aspect of the present embodiment, wherein the memory storing program instructions that when executed by the processor, further causes the processor to determine if the request is coming from an allowed referrer. In another aspect, wherein the memory storing program instructions that when executed by the processor, further causes the processor to serve a house ad if the request did not come from an allowed referrer. In another aspect, wherein the memory storing program instructions that when executed by the processor, further causes the processor to log an impression.

In another aspect of the present embodiment, wherein the memory storing program instructions that when executed by the processor, further causes the processor to log an impression. In another aspect, wherein the memory storing program instructions that when executed by the processor, further causes the processor to determine if a cookie or object has been set on user agent 102. In yet another aspect, wherein the memory storing program instructions that when executed by the processor, farther causes the processor to request for partner information if no cookie or object has been set. In another aspect, wherein the memory storing program instructions that when executed by the processor, further causes the processor to set a unique user identification if no cookie or object has been set. In another aspect, wherein the memory storing program instructions that when executed by the processor, further causes the processor to set session information if no cookie or object has been set.

In yet another aspect of the present embodiment, wherein the memory storing program instructions that when executed by the processor, further causes the processor to read a unique user identification and session information if a cookie or object has been set. In another aspect, wherein applying restrictions to the ad network tags includes restricting the ad network tags by country. In still yet another aspect, wherein applying restrictions to the ad network tags includes restricting the ad network tags by direct marketing association. In another aspect, wherein applying restrictions to the ad network tags include restricting the ad network tags by a frequency cap. In another aspect, wherein selecting an ad network tag by weighing the restricted ad network tags includes determining a probability of when each ad network corresponding with the restricted ad network tags can serve an ad.

In accordance with still yet another embodiment of the present application an ad engine 112 having a computer readable medium for storing instructions is presented. The instructions, when executed by at least one processor on the ad engine 112, causes the ad engine 112 to perform a method. The method includes, in a separate process, periodically gathering a set of ad network tags associated with a plurality of ad networks 106, receiving a request for an ad network tag along with user information from a user agent 102, optimizing the periodically gathered set of ad network tags by ranking the set of ad network tags using a set of rules and the user information from the user agent 102, and selecting an ad network tag from the optimized set of ad network tags and serving the selected ad network tag in response to the request from the user agent 102.

In one aspect of the present embodiment, wherein the set of ad network tags are gathered daily. In another aspect, wherein the set of ad network tags are gathered hourly.

In accordance with still another embodiment of the present application an ad engine 112 having a computer readable medium for storing instructions is presented. The instructions, when executed by at least one processor on the ad engine 112, causes the ad engine 112 to perform a method. The method includes receiving a request for an ad network tag along with user information from a user agent 102, retrieving a set of available ad network tags, optimizing the set of available ad network tags by ranking the set of ad network tags using a set of rules and user information from the user agent 102, and selecting an ad network tag from the optimized set of ad network tags, and serving the selected ad network tag in response to the request from the user agent 102.

In one aspect of the present embodiment, wherein receiving user information from the user agent 102 includes geographical information. In another aspect, wherein receiving user information from the user agent 102 includes contextual information. In yet another aspect, wherein receiving user information from the user agent 102 includes behavioral information.

In accordance with still another aspect of the present application an ad engine 112 having a computer readable medium for storing instructions is presented. The instructions, when executed by at least one processor on the ad engine 112, causes the ad engine 112 to perform a method. The method includes receiving a request for an ad network tag along with user information from a user agent 102, sending the user information to a plurality of partners and receiving partner data based on the user information, retrieving a set of ad network tags, optimizing the set of available ad network tags by ranking the set of ad network tags using a set of rules and partner data, and selecting an ad network tag from the optimized set of ad network tags and serving the selected ad network tag in response to the request from the user agent 102.

In one aspect of the present embodiment, wherein the set of rules provides a different weight for each ad network tag based on the partner data. In another aspect, wherein the set of rules eliminates previously seen ad network tags. In yet another aspect, wherein the plurality of partners includes a contextual partner. In another aspect, wherein the plurality of partners includes a behavioral partner. In another aspect, wherein the plurality of partners includes a data IP intelligence partner (geographical).

In accordance with still another embodiment of the present application an ad engine 112 having a computer readable medium for storing instructions is presented. The instructions, when executed by at least one processor on the ad engine 112, causes the ad engine 112 to perform a method. The method includes receiving a request for an ad network tag along with user information from a user agent 102, retrieving a set of local ad network tags, selecting a local ad network tag from the set of local ad network tags that generates the highest revenue, receiving a set of partner ad network tags, selecting a partner ad network tag from the set of partner ad network tags that generates the highest revenue, serving the local ad network tag if the revenue generated by the local ad network tag is greater than the revenue generated by the partner ad network tag, and serving the partner ad network tag if the revenue generated by the partner ad network tag is greater than the revenue generated by the local ad network tag.

In one aspect of the present embodiment, wherein receiving user information from a user agent 102 includes receiving objects from the user agent 102 if a JavaScript default tag was previously served. In another aspect, wherein receiving user information from a user agent 102 comprises receiving cookies from the user agent 102 if an IFrame default tag was previously served.

In accordance with another embodiment, an ad engine 112 having a computer readable medium for storing instructions is presented. The instructions, when executed by at least one processor on the ad engine 112, causes the ad engine 112 to perform a method. The method includes receiving a request for an ad network tag along with user information from a user agent 102, retrieving a set of partner ad network tags, applying restrictions, targeting, and optimizations to the set of ad network tags, selecting an ad network tag from the restricted, targeted, and optimized set of ad network tags, and serving the selected ad network tag in response to the request from the user agent 102.

As shown above, each hardware embodiment for user agent 102, ad engine 112, ad network 106, and host server 104 can include similar devices. These devices can include a processing unit, a system memory, and a system bus that operatively couples various system components, including the system memory to the processing unit. Within each of these hardware embodiments there may be only one or there may be more than one processing unit, such that the processor includes a single central processing unit (CPU), or a plurality of processing units, commonly referred to as a parallel processing environment.

The system bus may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system (BIOS), containing the basic routines that help to transfer information between elements, such as during start-up, is stored in ROM.

Each of these hardware embodiments can also include a hard disk drive for reading from and writing to a hard disk, a magnetic disk drive for reading from or writing to a removable magnetic disk, and an optical disk drive for reading from or writing to a removable optical disk such as a CD ROM or other optical media.

The hard disk drive, magnetic disk drive, and optical disk drive can be connected to the system bus by a hard disk drive interface, a magnetic disk drive interface, and an optical disk drive interface, respectively. The drives and their associated computer-readable media provide nonvolatile storage of computer-readable instructions; data structures, e.g., a catalog and a context-based index; program modules, e.g., a web service and an indexing robot; and other data. It should be appreciated by those skilled in the art that any type of computer-readable media that can store data and is accessible, or example, magnetic cassettes, flash memory cards, digital video disks, RAM, and ROM, may be used in these exemplary operating environments.

Within some of the hardware embodiments, a user 110 may enter commands and information into the component through input devices such as a keyboard and pointing device, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit through a serial port interface that is coupled to the system bus, but may be connected by other interfaces, such as a parallel port, game port or a universal serial bus (USB).

A monitor or other type of display device can also be connected to the system bus via an interface, such as a video adapter. In addition to the monitor, some of the hardware embodiments typically include other peripheral output devices, such as a printer and speakers. These and other output devices are often connected to the processing unit through the serial port interface that is coupled to the system bus, but may be connected by other interfaces, such as a parallel port, game port, or a universal serial bus (USB).

The components may operate in a networked environment using logical connections to one or more remote components of the system. These logical connections may be achieved by a communication device coupled to or integral with the component; the application is not limited to a particular type of communications device. The remote component may be another computer, a server, a router, a network personal computer, a client, a peer device, or other common network node, and typically includes many or all of the elements described above relative to the component. Components can be logically connected to the internet 1072. The logical connection can include a local area network (LAN), wide area network (WAN), personal area network (PAN), campus area network (CAN), metropolitan area network (MAN), or global area network (GAN). Such networking environments are commonplace in office networks, enterprise-wide computer networks, intranets and the Internet, which are all types of networks.

When used in a LAN environment, some hardware embodiments within the system may be connected to the local network through a network interface or adapter, which is one type of communications device. When used in a WAN environment, the hardware embodiment typically includes a modem, a network adapter, or any other type of communications device for establishing communications over the wide area network. The modem, which may be internal or external, is connected to the system bus via the serial port interface. In a networked environment, program modules depicted relative to the components, or portions thereof, may be stored in a remote memory storage device. It is appreciated that the network connections shown are exemplary and other means of and communications devices for establishing a communications link between the components of the system may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The embodiments presented herein of the components of the system and the method are preferably computer programs ran on a computer system. One skilled in the relevant art will appreciate that the computer system can include code that is loaded from a hard drive to be run on the processor. Alternatively, the system can be saved on a suitable storage medium such as a diskette, a CD, or like devices.

The system can take the form of an entirely hardware embodiment, an entirely software embodiment or an embodiment containing both hardware and software elements. In one embodiment, the system is implemented in software, which includes but is not limited to firmware, resident software, microcode, etc.

Furthermore, the system can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-RAW) and DVD.

A data processing system suitable for storing and/or executing program code includes at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the components either directly or through intervening I/O controllers.

Network adapters may also be coupled to the components of the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the internet 1072. As is well known to those skilled in the art, the term "internet" 1072 refers to the collection of networks and routers that use the Transmission Control Protocol/Internet Protocol ("TCP/IP") to communicate with one another. The internet 1072 can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet 1072 comprises a vast number of such interconnected networks, computers, and routers.

The internet 1072 has recently seen explosive growth by virtue of its ability to link computers located throughout the world. As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the internet 1072. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A website is a server/computer connected to the internet 1072 that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a website elsewhere on the internet 1072. Each hyperlink is assigned a URL that provides the name of the linked document on a server connected to the internet 1072. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer, is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system comprising:
   a storage unit configured to store local ad network tags and bids received with each respective ad network tag submitted by ad networks;
   a network interface;
   a processing unit in communication with said storage unit and said network interface, and configured to execute an ad engine, the ad engine configured to interact with a plurality of ad networks simultaneously and capable of receiving requests for ad network tags via the network interface from a user agent configured to render a page inclusive of an ad tag and at least one ad impression, and, in response to the requests for ad network tags, the ad engine further being capable of providing ad network tags to the user agent to cause the user agent to send ad requests based on the ad network tags, the ad engine, responsive to a request for an ad network tag from the user agent, further being configured to cause said processing unit to:
   simultaneously communicate a call to multiple ad network servers, in a first plurality of ad network partner servers, to request a bid from each of the multiple ad network partners for placing an ad with the user agent;
   receive bids from the first plurality of ad network partners servers;
   determine a highest bid from the ad network partners;
   determine a winning local ad network tag from the stored local ad network tags;
   determine whether a price associated with the winning local ad network tag is higher than the highest bid from the ad network partners; and
   in response to determining that the price associated with the winning local ad network tag is higher than the highest bid from the ad network partners, serve the winning local ad tag to the user agent;
   otherwise, serve an ad network tag associated with the highest bid from the ad network partners.

2. The system of claim 1, further comprising a host server for providing the page to the user agent.

3. The system of claim 2, wherein the host server, user agent, ad engine, and plurality of ad networks communicate through a network.

4. The system of claim 1, wherein the page includes two or more impressions with each impression served by different ad networks within the plurality of ad networks.

5. The system of claim 1, wherein the page includes two or more impressions with each impression served by different or similar ad networks within the plurality of ad networks.

6. The system of claim 1, wherein the ad tag within the page is configured to cause the user agent to request ad network information including publisher's account information so the ad engine can determine which ad network tags can be sent to the user agent.

7. The system of claim 6, wherein determining which ad network tags can be sent to the user agent is based on subject matter of the page.

8. The system of claim 1, wherein the ad tag within the page is configured to cause the user agent to request ad network information including publisher's account information so the ad engine can track statistical data for the publisher.

9. The system of claim 1, wherein the ad engine is configured to provide ad network tags is based on known inventory levels of the plurality of ad networks.

10. The system of claim 1, wherein the maximum number of ads from the plurality of ad networks that have been served is five.

11. The system according to claim 1, wherein the ad agent is further configured to receive default or non-default ads from the ad network partners in response to the requests from the user agent until a qualified ad is obtained by the user agent for at least one ad impression within a page, the qualified ad being a non-default ad served from ad networks within the plurality of ad networks, a default ad after a maximum number of ads from the plurality of ad networks have been served, or a default ad after a period of time elapses.

12. The system according to claim 1, wherein communication of a call includes communication of a real-time http request.

13. A method of matching and optimizing ads for placement on a network location, said method comprising:
   receiving, by a processing unit, a plurality of local network tags and associated prices for placement of respective local ad network tags;
   storing, in a data repository being stored by a storage unit, the plurality of local ad network tags and associated prices;
   selecting, by the processing unit, a winning local ad network tag from the received local ad network tags;
   in response to the processing unit receiving a request for an ad network tag from a user agent via a communications network, simultaneously communicating, by the processing unit, a call to a plurality of ad network servers of respective ad partners, to request respective bids for submitting an ad, wherein the processing unit configured to interact with a plurality of ad networks simultaneously;
   in response to receiving a bid from at least one of the ad network partners via a respective ad network partner server, selecting, by the processing unit, a highest bid from the at least one of the ad network partners;
   determining, by the processing unit, whether the highest bid is higher than a price associated with the winning local ad network tag; and
   in response to determining that the price associated with the winning local ad network tag is higher than the highest bid from the ad network partners, causing, by the processing unit, the winning local ad network tag to be served to the user agent via the communications network,
   otherwise, causing, by the processing unit, an ad network tag associated with the highest bid from the at least one of the ad network partners to be served to the user agent via the communications network.

14. The method according to claim 13, wherein selecting a winning local ad network tag includes selecting a local ad network tag based on at least one of a closest geographical location associated with content of an ad, closest contextual relationship associated with content of an ad, or closest behavioral relationship of user associated with an ad, and price an advertiser is willing to pay for placement of an ad.

15. The method according to claim 13, further comprising:
in response to the processing unit receiving the request from the user agent for an ad network tag, retrieving, by the processing unit from the data repository, the local ad network tags; and
applying, by the processing unit, at least one rule to the retrieved local ad network tags.

16. The method according to claim 15, wherein applying the at least one rule includes applying at least one of restrictions, targeting, and optimization rules.

17. The method according to claim 16, wherein applying at least one of restrictions, targeting, and optimization includes applying weights to the local ad network tags based on information from the user agent.

18. The method according to claim 16, wherein applying restrictions includes applying at least one of geographical, contextual, behavioral, and demographical restrictions.

19. The method according to claim 13, wherein the plurality of ad network partners include contextual partners, behavioral partners, and geographical partners.

20. The method according to claim 13, further comprising performing, by the processing unit, multi-variate testing of ads from different ad networks to find ad networks with the best ads based on higher click rates or highest revenue generation.

21. The method according to claim 20, further comprising applying, by the processing unit, weights to ad networks, wherein higher weights are applied to ad networks that have higher click rates.

22. The method according to claim 20, further comprising applying, by the processing unit, weights to ad networks, wherein higher weights are applied to ad networks that have higher revenue generation.

23. The method according to claim 13, further comprising:
storing, in the data repository, at least one default ad network tag; and
selecting, in the data repository, a default ad network tag from the at least one default ad network tags after a maximum number of ads from the ad network partners have been served and no local ad network tags are available to be served or after a period of time elapses.

24. The method according to claim 13, wherein communicating a call includes communicating a real-time http request.

* * * * *